US009774586B1

(12) United States Patent
Roche et al.

(10) Patent No.: US 9,774,586 B1
(45) Date of Patent: Sep. 26, 2017

(54) DYNAMIC AUTHORIZATION OF USERS IN A MULTI-TENANT ENVIRONMENT USING TENANT AUTHORIZATION PROFILES

(71) Applicant: EMC Corporation, Hopkinton, MA (US)

(72) Inventors: Michael G. Roche, Hamilton (CA); Michal J. Drozd, Krakow (PL)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 14/840,573

(22) Filed: Aug. 31, 2015

(51) Int. Cl.
G06F 7/04 (2006.01)
H04L 29/06 (2006.01)

(52) U.S. Cl.
CPC ............ H04L 63/08 (2013.01); H04L 63/102 (2013.01); H04L 63/107 (2013.01)

(58) Field of Classification Search
CPC ...... H04L 63/08; H04L 63/107; H04L 63/102
USPC .......................................................... 726/4
See application file for complete search history.

(56) References Cited

U.S. PATENT DOCUMENTS 9,098,539 B2 * 8/2015 Lissack ............... G06F 17/3007
2010/0125612 A1 * 5/2010 Amradkar ............ H04L 63/105
707/802
2014/0090037 A1 * 3/2014 Singh .................. H04L 63/0815
726/7
2014/0215595 A1 * 7/2014 Prasad ..................... G06F 21/41
726/8
2015/0046971 A1 * 2/2015 Huh ....................... H04L 9/3213
726/1
2015/0059005 A1 * 2/2015 Lao ......................... G06F 21/10
726/29
2015/0172321 A1 * 6/2015 Kirti .................... H04L 63/1416
726/1

* cited by examiner

Primary Examiner — Mohammad W Reza
(74) Attorney, Agent, or Firm — Blakely, Sokoloff, Taylor & Zafman LLP

(57) ABSTRACT

In response to a request received from a client device to authorize a user for accessing a resource associated with a tenant, user roles of the user within the tenant are determined. For each of the user roles, user privileges the user is entitled within a capacity of the user role are determined based on static access control settings associated with the user. A tenant authorization profile associated with the tenant is accessed to determine tenant roles and tenant privileges for each tenant role. For each of the user roles that matches at least one of the tenant roles, at least one user privilege is modified based on corresponding tenant privileges of the matched tenant role. A token is generated based on the user roles and the modified user privileges and transmitted to the client device to determine whether the user is allowed to access the resource of the tenant.

20 Claims, 12 Drawing Sheets

| ACE # | Resource ID | Tenant ID(s) | Role ID(s) | Privilege ID(s) |
|---|---|---|---|---|
| 1 | ABC | Tenant C | Operator | VIEW_EMAIL |
| 2 | ABC | Tenant B, Tenant C | Email Admin | VIEW_EMAIL, DELETE_EMAIL |
| ... | ... | ... | ... | ... |

ACL DB 150

FIG. 3

| Application Name | |
|---|---|
| Application Version | |
| Application Role1 | Role1 Opaque Object1 |
| Application Role2 | Role2 Opaque Object1 |
| Application Role3 | Role3 Opaque Object1 |
| Application Role4 | Role4 Opaque Object1 |

FIG. 7A

| Restricted Data Name | |
|---|---|
| Restricted Data Version | |
| Restricted Data Role1 | Role1 Opaque Object1 |
| Restricted Data Role2 | Role2 Opaque Object1 |
| Restricted Data Role3 | Role3 Opaque Object1 |
| Restricted Data Role4 | Role4 Opaque Object1 |

FIG. 7B

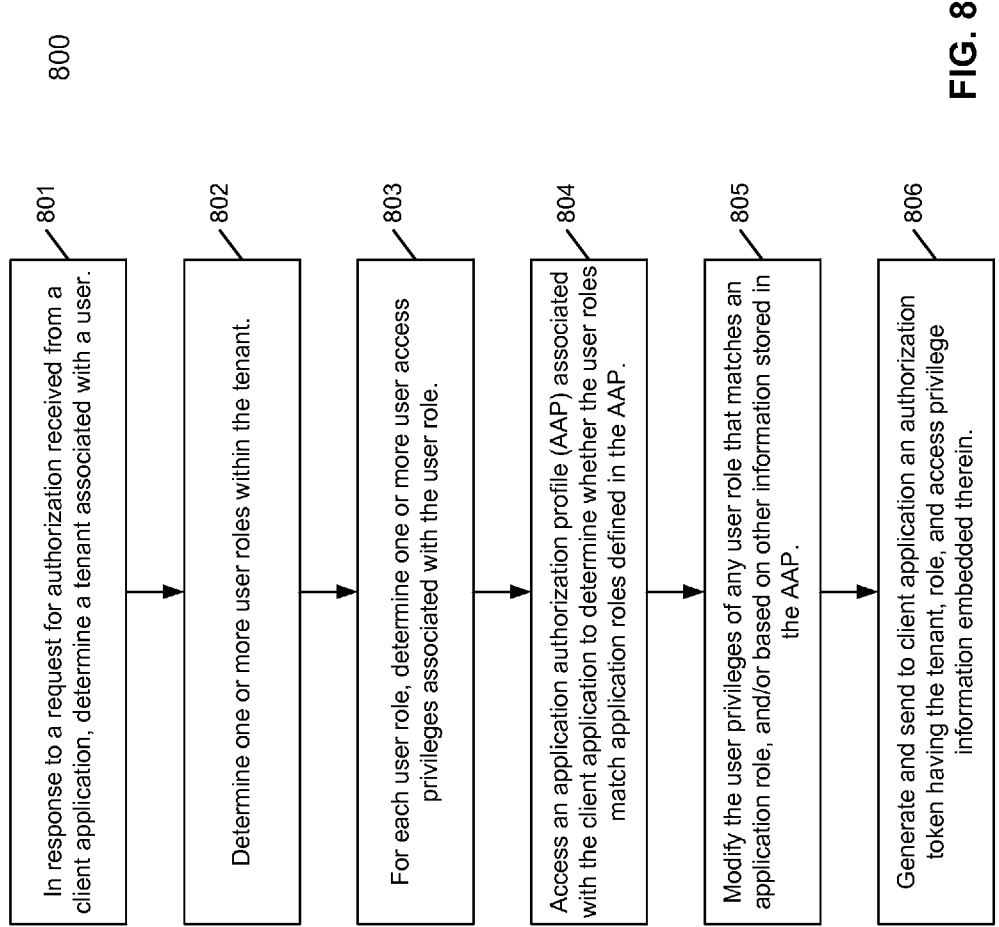

DYNAMIC AUTHORIZATION OF USERS IN A MULTI-TENANT ENVIRONMENT USING TENANT AUTHORIZATION PROFILES

FIELD OF THE INVENTION

Embodiments of the present invention relate generally to data storage systems. More particularly, embodiments of the invention relate to authentication, authorization, and managing access control of users in a multi-tenant environment.

BACKGROUND

A multi-tenant environment refers to a technology wherein a single storage system is deployed to serve multiple customers, each customer using the same storage system for their protection storage requirements. A storage system, which supports multi-tenants, must satisfy the security and isolation requirements. Here, the "security and isolation requirements" refer to the requirements that each customer's dataset must be secured and isolated from the other customers on the storage component. The security and isolation requirements apply to the authentication and authorization of customers that request data access. For example, a customer (e.g., a tenant) must not be able to enter another customer's data sets, or read or write to data sets that belong to another customer. The security and isolation requirements can also refer to managing access control. For example, an administrator of one customer must not be able to perform system configuration, monitoring, etc., of the datasets that belong to another customer. Thus, although the customers may share the same storage system for authenticating, authorizing, backing up, restoring, or replicating their datasets, none of the customers can be aware of the presence of other customers in the storage system.

Typically, authentication and authorization are performed based on a set of statically configured access control settings or rules, which are rarely changed or changed less frequently. Such conventional authorization model lacks the necessary flexibility and is unable to meet the needs of various customers due to the lack of flexibility in granting access. Applications treat authorization as an application specific need with an inability to handle multiple applications in a generic manner. The conventional authorization models lead to inefficient internal design and architecture. This leads to poor performance and code workflows as access control evaluation involve complex lookups and matches to user's privileges. What is most apparent from these designs is the inability to support tenancy. The inefficient design limits the ability to support a true multi-tenancy model in that multiple tenants cannot be defined nor can an access control model be enabled that gives tenants control over their own environments.

BRIEF DESCRIPTION OF THE DRAWINGS

Embodiments of the invention are illustrated by way of example and not limitation in the figures of the accompanying drawings in which like references indicate similar elements.

FIG. 3 is a block diagram illustrating an example of an access control list database according to one embodiment of the invention.

FIG. 7A is a block diagram illustrating an example of an application authorization profile according to one embodiment.

FIG. 7B is a block diagram illustrating an example of a tenant authorization profile according to one embodiment.

FIG. 8 is a flow diagram illustrating a process of authentication and authorization according to one embodiment of the invention.

DETAILED DESCRIPTION

Figure 1:
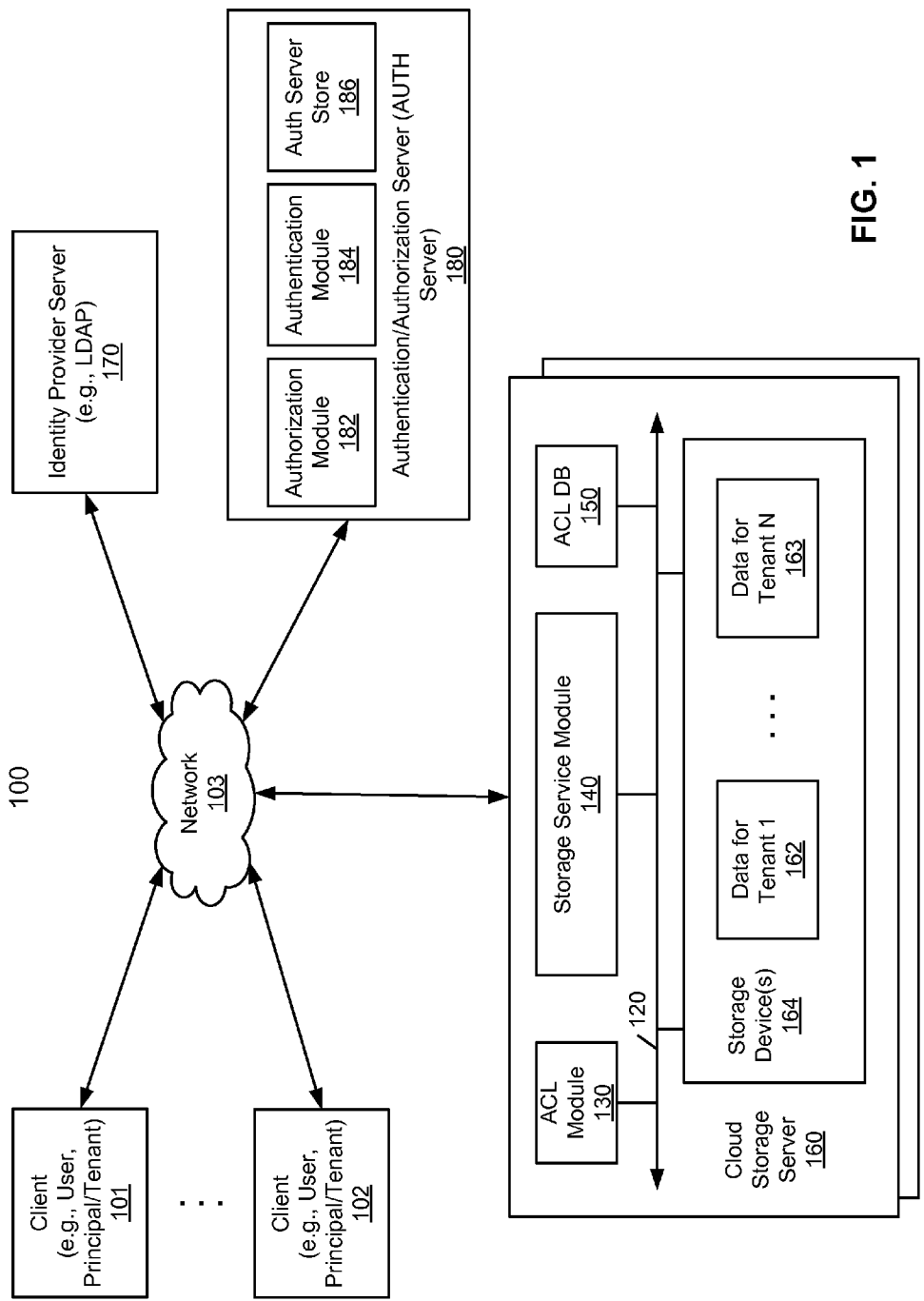
FIG. 1 is a block diagram illustrating an authentication/authorization system in a multi-tenant environment according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Embodiments of the present invention address authenticating and authorizing users, and managing access control of users in a multi-tenant environment. According to some embodiments, an authentication and authorization server (also referred to as an AUTH server) is utilized to authenticate and authorize users (also referred to as principals) who may have different roles in different tenants of the same organization entity or different organization entities.

According to one embodiment of the invention, in response to a request received from a client device (e.g., a cloud storage system) for authenticating and authorizing a user for accessing resources, the AUTH server authenticates the user based on user credential such as a username and password of the user. The AUTH server also identifies a list of one or more tenants of which the user is a member. For each of the identified tenants, user's role or roles are identified and for each of the roles, one or more access privileges of the role are also identified. Such user's roles of tenants and privileges of each role may be statically configured by an administrator of a service provider that provides the resources. Such settings may be referred to as static settings or permanent settings intended to remain valid or unchanged for a relatively long period of time.

In addition, according to one embodiment, for each of the tenant, a corresponding tenant authorization profile (TAP, also referred to as a tenant policy profile or TPP) is accessed, where the tenant authorization profile stores a set of access control rules or settings that have been dynamically configured by an administrator associated with the corresponding tenant. Such settings may be referred to as dynamic settings or temporary settings intended to be valid for a relatively short period of time. The dynamic settings in a tenant authorization profile are dynamically configured at a point in time after the corresponding static settings have been configured. The dynamic settings may be used to substitute or override the static settings temporarily. In one embodiment, for a static setting that matches a dynamic setting, the corresponding attributes or properties of the dynamic settings are used in lieu of the static counterparts.

An AUTH token is then generated having information indicating the tenants, roles of each tenant, and privileges of each role for the user, where the information obtained from the tenant authorization profile will supersede the information obtained from the static settings. The AUTH token is returned to the client device to allow the client device to determine whether the user is allowed to access a particular resource associated with the client device. As a result, an administrator of a tenant can temporarily modify the access control settings associated with the corresponding tenant, without having to modify the static settings, which may by modified only an administrator of a service provider.

Similarly, according to one embodiment, an application through which a user attempts to access a resource may be associated with an application authorization profile (AAP). An application authorization profile stores dynamic access control settings that are associated with that particular application. The application authorization profile stores application roles and application privileges with which a user is entitled to access resources provided via the corresponding application. When an AUTH token is generated, the user roles and user privileges defined therein are compared with the application roles and application privies defined in the corresponding application authorization profile. For any user role that matches an application role, the user privileges in the token may be overridden by the application privileges defined in the application authorization profile. An application authorization profile allows an administrator associated with the corresponding application to define dynamic access control configurations that can be used to supersede or override the static access control settings, for example, temporarily for a period of time. An application authorization profile, a tenant authorization profile, or a combination of both can be utilized for the purpose of dynamic configuration of access control.

FIG. 1 is a block diagram illustrating an authentication/authorization system in a multi-tenant environment according to one embodiment of the invention. As used herein, a "tenant" refers to the highest unit of abstraction for providing security and logical separation or isolation in a multi-tenant storage system. A tenant also acts as the highest abstraction for allocating and tracking resource utilization by the tenant. As used herein, a "resource" may refer to data such as a file, an object, a workflow, or a directory of one or more files, objects, etc. Alternatively, a resource can refer to a service (e.g., software as a service, storage as a service) provided by a server or a cluster of one or more servers associated with a service provider. As used herein, a tenant can be a business unit or a group of one or more users (e.g., a human resource department, a finance department, an information technology department, etc.) within an enterprise or corporation (e.g., Tenant A, Tenant B, Tenant C, etc.). A tenant can also refer to an enterprise (e.g., when a storage system/appliance is deployed by a service provider). Note that these tenants may also have parent and/or child tenants, which create/define "tree" hierarchies for the tenants in the multi-tenant environment.

Referring to FIG. 1, system 100 includes, but is not limited to, one or more client systems 101-102 communicatively coupled to cloud storage server 160, identity provider server 170, and AUTH server 180 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. As used herein, a client may also refer to a user/principal, a principal tenant, a child tenant, and/or a component in a multi-tenant environment. Alternatively, any of clients 101-102 may be a primary storage system (e.g., local data center) that provides storage to other local clients, which may periodically back up the content stored therein to a backup storage system (e.g., a disaster recovery site or system), such as cloud storage system 160. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Cloud storage system 160 may be located in proximity to one, both, or neither of clients 101-102.

Cloud storage server 160 may be a storage system that includes or represents any type of servers or a cluster of one or more servers (e.g., cloud servers). For example, cloud storage server 160 may be a storage server used for various different purposes, such as to provide multiple users or client systems with access to shared data and/or to back up (or restore) data (e.g., mission critical data), which may be hosted via a variety of applications or programs. Cloud storage server 160 may provide storage services to clients or users via a variety of access interfaces and/or protocols such as file-based access protocols and block-based access protocols. Cloud storage server 160 may be, for example, a file server (e.g., an appliance used to provide network attached storage (NAS) capability), a block-based storage server (e.g., used to provide a storage area network (SAN) capability), a unified storage device (e.g., one which combines NAS and SAN capabilities), a nearline storage device, a direct attached storage (DAS) device, a tape backup device, or essentially any other type of data storage device. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc.

Cloud storage server 160 may further provide storage services via an object-based protocol and Hadoop distributed file system (HDFS) protocol. Cloud storage server 160 may have a distributed architecture, or all of its components may be integrated into a single unit. Cloud storage server 160 may be implemented as part of an archive and/or backup system such as a deduplicating storage system available from EMC® Corporation of Hopkinton, Mass.

In one embodiment, cloud storage server 160 further includes a storage manager or storage controller (not shown) configured to manage storage resources of cloud storage server 160, such as, for example, storage space and processing resources (e.g., processor, memory, network resources). The storage manager or controller may be accessed by a user/principal of the cloud storage server 160 remotely via a management or configuration interface or management server or portal (not shown). The user/principal may create, revoke, realign, and/or manage storage resources based on component agreements derived from a set of tenants, roles, and/or privileges. The storage resources of cloud storage server(s) 160 may be virtualized into a pool of virtual storage resources, where underlying physical storage resources represented by the corresponding virtual storage resources may be implemented locally, remotely (e.g., hosted by another storage system), or both.

The virtual storage resources can be provisioned, allocated, and/or defined by a user/principal or by a service provider based on a set of software-defined tenants, roles and privileges. The virtual storage resources may be represented in one or more virtual machines (e.g., virtual storage systems) managed by one or more virtual machine managers (VMMs). Each of the virtual machines can be provisioned to provide a particular type of storage services (e.g., resource-based, file-based, block-based, object-based, HDFS, etc.) to a client based on a cloud storage server level agreement associated with that particular client as part of software-defined storage services (e.g., authentication/authorization services, tenant services, resource services, etc.).

In one embodiment, cloud storage server 160 includes, but is not limited to, storage service module 140 (also referred to as service logic, service engine, or service unit, which may be implemented in software, hardware, or a combination thereof), access control list (ACL) module 130, ACL database 150, and one or more storage devices 164 storing data associated with one or more tenants 162-163, where these components are communicatively coupled to each other via interconnect 120, which may be a bus and/or a network. Storage service module 140 may represent any storage service related to components configured or adapted to provide storage services (e.g., storage as a service) to a variety of clients using any of the access protocols set forth above. For example, storage service module may include backup logic (not shown) configured to receive and back up data from client (e.g., clients 101-102) and to store the backup data in any of the storage devices 164 associated with one or more tenants 162-163. In the illustrated example, storage service module 140 may further include restore logic (not shown) configured to retrieve and restore backup data from any one or more tenants 162-163 back to a client (e.g., clients 101-102). Storage devices 164 storing data for tenants 162-163 may be persistent storage devices, such as, for example, hard disks, an array of disks, and/or storage appliances.

In one embodiment, storage service module 140 may be part of an application or program that provides cloud storage services to a variety of clients, such as, for example, database software or content provider software. Also note that cloud storage server 160 may host multiple applications or software that provide a variety of different services to clients. The applications or software may be provided by a variety of application or software providers. The applications or software may be configured based on their respective configurations or settings (e.g., access control settings).

ACL module 130 may represent any access control service related to multiple access control lists configured or modified to provide a secured access control service to a variety of clients within a multi-tenant environment. ACL module 130 may be loaded into memory such as a random access memory (RAM) and executed by one or more processors (e.g., general-purpose processors such as central processing units or CPUs, or special-purpose processors). ACL DB 150 may include, but is not limited to, one or more access control entries (ACE) associated with one or more tenants (e.g., tenants 162-163). ACL DB 150 may also be stored in a persistent storage device 164 and when being accessed, loaded into the memory and executed by the processor(s).

ACL DB 150 may represent multiple access control lists that are attributes of a file or directory that control which users (e.g., clients 101-102) on a file storage (e.g., storage 164) can access the file or directory. Different types of access are defined, typically read, write, and/or execute. A single ACE includes, but is not limited to, a resource ID, a tenant ID, a role ID, and a privilege ID. Further, an ACE specifies either allow or deny, the type of access (e.g., read/write), and the user or user group the access refers to. An example of ACL DB 150 is shown in FIG. 3, which will be described in details further below. Typically, an ACL contains all deny access entries followed by all allow access entries, or vice-versa. The ACL entries are evaluated by ACL module 130 to determine if a user is allowed access to a file belonging to a tenant (or child-tenants of the tenant). ACLs can be from several hundred bytes to hundreds of kilobytes.

ACLs may be stored in an ACL database 150 that contains ACL data that refers to permission attributes associated with a file or directory of one or more files. Most operating systems, such as Windows, network file system (NFS), or UNIX, store ACL data along with the content data. For example, when a file is requested, the ACL data may also be embedded within the requested file along with the associated files or directories. In one embodiment, an ACE (i.e., stored in the ACL database 150 and/or AUTH server 180) may include, but is not limited to, a permission mask (e.g., read, write, delete, create, administer, etc.), and a role assignment SIDR (also referred to as a unique secured identity role), which includes information identifying a particular tenant and role.

In one embodiment, ACLs are located in components that are performing access control to resources and/or tenants. Further, each ACE includes a "known" privilege that is required to access a resource, and a reference to a tenant in which this "known" privilege is applicable to access the resource. As used herein, a "known" privilege refers to a type of access such as read, write, delete, create, and/or administer that have been predefined according to a specification or protocol of a file system or storage system. Each resource may be associated with one or more ACEs/ACLs. For example, a first ACE provides that an email resource can be read by users with a "read email" privilege at Tenant A, while a second ACE provides that the email resource can be read by users with an "email administration" privilege at Tenant B. By way of example, in order to determine whether to allow or deny a user access to the email resource, a component compares the ACE/ACL of the email resource against an AUTH token, which is associated with the requesting user and generated by an authorization server. As used herein, a "component" refers to a single unit within a multi-tenant environment. A component may be, but is not limited to, any type of component such as a server (e.g., a NFS server, a Server Message Block (SMB) server, a Protection Point Server, DDBoost), a child/parent tenant server, a product server, a client server, and/or a user interface, or any combination thereof.

Further, the AUTH token includes, but is not limited to, each role the requesting user is authorized to use within the tenant that the user logged in to (described in further detail below). Continuing on with the above example, the component will allow the user access to the email resource if the AUTH token includes a role within the requested tenant (e.g., the tenant the user is logged in to) that matches the identified role and tenant from the ACE/ACL of the email resource and/or the role's privileges include privilege to access emails. If not, the component will deny the user from accessing the email resource.

In the illustrated example, cloud storage server 160 includes storage device(s) 164 associated with tenant 162 and tenant 163. Data of tenants 162-163 may be stored in the same storage device or different storage devices dependent upon specific configurations. Each tenant may be allocated with a specific amount of storage space or alternatively, the storage space may be allocated on a subscription basis according to a service level agreement (e.g., storage as a service).

In one embodiment, a user (e.g., clients 101-102) may access data stored in storage device(s) 164 through tenants 1 and N using various protocols. For example, tenants 1 and N may need to be authenticated and authorized using AUTH Server Client protocol (available from EMC® Corporation of Hopkinton, Mass.) before accessing the data associated with the respective tenants. Further, users associated with tenants 1 and N can access data stored in storage device(s) 164 using: (1) DDBoost protocol (available from EMC® Corporation of Hopkinton, Mass.), in which case file storages 164 are known as storage units; (2) NFS or CIFS protocol, in which case file storages 164 are known as VTL pools; or (3) Protection Point protocol, in which case file storages 164 are known as Vdisks. Various other protocols can be used without departing from the broader scope and spirit of the present invention.

Further, by using the access protocols, cloud storage server 160 enables tenants 1 and N to have their own respective tenant principals, and thus, do not rely on a system admin/provider (not shown). A principal may operate within a tenant, which is not the tenant the principal belongs to. As used herein, a "principal" may refer to a user, a tenant, a parent/child tenant, a service provider, and/or a client. Further, a principal is associated with, but not limited to, a set of privileges and a set of roles used to access one or more tenants. A principal may also have multiple roles within multiple tenants (described further below). Various mechanisms of the present invention shall become apparent through the description of other figures below.

Storage device(s) 164 may be implemented locally (e.g., single node operating environment) or remotely (e.g., multi-node operating environment) via interconnect 120, which may be a bus and/or a network (e.g., a storage network or a network similar to network 103). Storage device(s) 164 may include a single storage device such as a hard disk, a tape drive, a semiconductor memory, conventional magnetic disks, optical disks such as CD-ROM or DVD based storage, magnetic tape storage, magnetic-optical (MO) storage media, solid state disks, flash memory based devices, multiple storage devices such as a redundant array system (e.g., a redundant array of independent disks (RAID)), a system for storage such as a library system or network attached storage system, or any other type of non-volatile storage devices or systems suitable for storing large volumes of data. Storage device(s) 164 may store one or more data files or segments of files (also referred to as resources, workflow, data objects, objects) to be accessed by one or more authenticated/authorized users.

In one embodiment, segments of data files are stored in a deduplicated manner, either within each of Storage device 164 or across at least some of Storage devices 164. In one embodiment, storage service module 140 further includes or is associated with a deduplication logic (not shown) configured to segment data files into segments, to deduplicate the segments into deduplicated segments, and to store the deduplicated segments in storage device(s) 164. Data stored in storage device(s) 164 may be stored in a compressed form (e.g., lossless compression: Huffman coding, Lempel-Ziv Welch coding; delta encoding: a reference to a chunk plus a difference, etc.). In one embodiment, different storage devices may use different compression methods (e.g., main or active file storages from other file storages, one file storage from another file storage, etc.). The metadata (not shown) may be stored in at least some of storage device(s) 164, such that files can be accessed independent of another file storage. Metadata of each file storage includes enough information to provide access to the files it contains.

Identity provider server 170 may include or represent any type of servers or a cluster of one or more servers (e.g., cloud servers). For example, identity provider server 170 may be an Active Directory or a lightweight directory access protocol (LDAP) deployed in a multi-tenant environment. Typically, identity provider server 170, for example, may be used to create fully customized and operational identity directory services that provide the client with principal identities (i.e., users who access a particular file) and policies for the ACL assignments in the multi-tenant environment. Identity providers may include one or more user account stores defined in a local database (e.g., AUTH server 180) or a leveraging external service (e.g. AD, LDAP, etc.). Each identity provider may be associated with one or more tenants and users. In one embodiment, an identity provider (e.g., identity provider server 170) is used to authenticate users that are requesting access to one or more tenants in the multi-tenant environment. Identity providers may organize user accounts in to a user group, such that the user accounts may belong to one or more user groups. A user group may also be organized/nested in to other user groups. Each identity provider (e.g., identity provider server 170) may be associated with one or more tenants in an authentication/authorization server (e.g., AUTH server 180) to grant the users/principals access to resources associated with one or more tenants.

AUTH server 180 may include any type of servers or cluster of servers used for authenticating, authorizing, and managing access control of users in a multi-tenant environment. As used herein, "auth" refers to a system/unit, which can be used to authenticate and authorize users within a multi-tenant environment. Contrary to a conventional multi-tenant authorization system, AUTH server 180 of embodiments of the present invention allows principals (e.g., clients 101-102) to be associated with one or more roles within one or more authorized tenants (e.g., tenants 162-163). For example, while a principal/user may be authorized to perform a set of roles within a first tenant, the principal/user may only be authorized to perform in a capacity of a particular role and/or a subset of the set of roles within a second tenant. AUTH server 180 provides an authentication and authorization protocol to external principals (e.g., end users, clients) and/or internal components (e.g., multi-tenant data protection system components, user interface components, etc.). AUTH server 180 may have a distributed architecture, or all of its components may be integrated into a single unit. In one embodiment, AUTH server 180 may be implemented locally (e.g., single node operating environment) or remotely (e.g., multi-node operating environment) via a bus and/or a network.

In one embodiment, through configuration interface associated with AUTH server 180 and/or cloud storage server 160, a user or administrator can configure a set of tenants, roles, and privileges for a principal to access one or more Resource Based Access Control (RBAC) components (also referred to as Role Based Access Control components) (not shown). In one embodiment, a user or administrator with proper privileges can configure cloud storage server(s) 160 and AUTH server 180 via a centralized management server or portal (not shown), where the configuration data is pushed from the management server or portal to cloud storage server(s) 160 and AUTH server 180 over a network. For example, RBAC is configured to use the metadata from ACL database 150 to determine whether tenants (e.g., tenants 162-163) may perform control access of one or more resources stored in file storages (e.g., storages 164).

AUTH server 180 is configured to provide client identity sources to various components (e.g., web user interface components) in a multi-tenant environment. AUTH server 180 is configured to use these identity sources to allow the components to implement their own RBAC components. For example, when users (e.g., clients 101-102) require an access to a client/component resource (e.g., storages 164), an access request is forwarded to AUTH server 180. In response to the requests, AUTH server 180 is responsible for authenticating, authorizing, and managing access control to the client/component resources (e.g., storages 164) by enabling components (e.g., tenants 162-163) to verify the users requests based on the AUTH server authentication and authorization protocol (described further below).

In one embodiment, AUTH server 180 includes, but is not limited to, authorization module 182, authentication module 184, and AUTH server store 186. Authorization module 182 may represent an authorization service related-component configured or adapted to provide authorization services (e.g., authorization as a service) to a variety of clients/tenants using any of the access protocols set forth above and through the discussion of the other figures below. For example, authorization module 182 is configured to isolate and secure components' access to resources by associating users with one or more privileges within one or more authorized tenants (i.e., roles). Authorization module 182 is configured to receive and authorize a user request from a client (e.g., clients 101-102) to access one or more resources of the client.

Authentication module 184 is configured to receive and verify information from a client (e.g., clients 101-102) and to identify the client information in any one or more identity provider components (e.g., identity provider server 170). Authentication module 184 may represent an authentication service related-component configured or adapted to provide authentication services (e.g., authentication as a service) to a variety of clients/tenants using any of the access protocols set forth above and through the discussion of the other figures below. For example, authentication module 184 is configured to identify clients using information including, but not limited to, a user name, a password, a tenant name, and/or a domain name. AUTH server store 186 may include, but not limited to, user objects, user group objects, identity source objects, domain objects, tenant objects, role objects, token objects, and/or privilege resources (described in further detail below). The configuration shown in FIG. 1 shall be referenced throughout the description. Throughout the description, references are made to IDs for users, tenants, roles, resources, identity sources/providers, tokens, domains, and privileges. It shall be understood that these IDs may be Universally Unique IDs (UUIDs).

According to one embodiment, these objects are configured to store static access control information of users, such as, for example, user roles within one or more tenants, and one or more user privileges of each role within a particular tenant. These settings are referred to as static or permanent access control settings that are not changed frequently. Such static access control settings may be configured by an administrator of a service provider associated with cloud storage server 160 and stored in AUTH server store 186 via a configuration interface of AUTH server 180.

In addition, according to one embodiment, AUTH server 160 further maintains application authorization profiles and tenant authorization profiles to store dynamically configured access control information for a variety of applications and tenants, respectively. According to one embodiment of the invention, in response to a request received from a client device (e.g., a cloud storage system) for authenticating and authorizing a user for accessing resources, the AUTH server authenticates the user based on user credential such as a username and password of the user. The AUTH server also identifies a list of one or more tenants of which the user is a member. For each of the identified tenants, user's role or roles, referred to as user roles, are identified and for each of the roles, one or more access privileges (referred to as user privileges) of the role are also identified. Such user's roles of tenants and privileges of each role may be statically configured by an administrator of a service provider that provides the resources. Such settings may be referred to as static settings or permanent settings intended to remain valid or unchanged for a relatively long period of time.

In addition, according to one embodiment, for each of the tenant, a corresponding tenant authorization profile is accessed, where the tenant authorization profile stores a set of access control rules or settings that have been dynamically configured by an administrator associated with the corresponding tenant. Such settings may be referred to as dynamic settings or temporary settings intended to be valid for a relatively short period of time. The dynamic settings in a tenant authorization profile are dynamically configured at a point in time after the corresponding static settings have been configured. The dynamic settings may be used to substitute or override the static settings temporarily. In one embodiment, for a static setting that matches a dynamic setting, the corresponding attributes or properties of the dynamic settings are used in lieu of the static counterparts.

An AUTH token is then generated having information indicating the tenants, roles for each tenant, and privileges of each role for the user, where the information obtained from the tenant authorization profile will supersede the information obtained from the static settings. The AUTH token is returned to the client device to allow the client device to determine whether the user is allowed to access a particular resource associated with the client device. As a result, an administrator of a tenant can temporarily modify the access control settings associated with the corresponding tenant, without having to modify the static settings, which may by modified only an administrator of a service provider.

Similarly, according to one embodiment, an application through which a user attempts to access a resource may be associated with an application authorization profile (AAP). An application authorization profile stores dynamic access control settings that are associated with that particular application. The application authorization profile stores application roles and application privileges with which a user is entitled to access resources provided via the corresponding application. When an AUTH token is generated, the user roles and user privileges defined therein are compared with the application roles and application privies defined in the corresponding application authorization profile. For any user role that matches an application role, the user privileges in the token may be overridden by the application privileges defined in the application authorization profile. An application authorization profile allows an administrator associated with the corresponding application to define dynamic access control configurations that can be used to supersede or override the static access control settings, for example, temporarily for a period of time. An application authorization profile, a tenant authorization profile, or a combination of both can be utilized for the purpose of dynamic configuration of access control.

Note that an application authorization profile and a tenant authorization profile, hereinafter referred to as AAP and TAP respectively, store data in similar formats with respect to those in the corresponding static counterparts. Throughout this application, for the purpose of illustration, when referring a role and a privilege specified in the static access control settings, they are referred to as a user role and a user privilege. When referring a role and a privilege in an AAP, they are referred to as an application role and an application privilege. When referring a role and a privilege in a TAP, they are referred to as a tenant role and a tenant privilege. Such a scheme is also applied to other access control settings or rules, referred to as user access control information/parameters, application access control information/parameters, and tenant access control information/parameters, respectively.

As described above, during the authorization, once the static access control settings have been determined for a user, an AAP associated with the corresponding client application from which an authorization request is received is examined to determine whether there is any user role and application role matched. For those matched user roles and application roles, the corresponding user privileges are replaced with the application privileges from the AAP. Similarly, a TAP for the tenant associated with the resources to be accessed is also examined to determine whether there is any user role and tenant role matched. For those matched user roles and tenant roles, the corresponding user privileges are replaced with the tenant privileges from the TAP. As a result, an administrator of a client application or a tenant can dynamically configure certain access control settings that can be used to replace the corresponding static counterparts.

Figure 2:
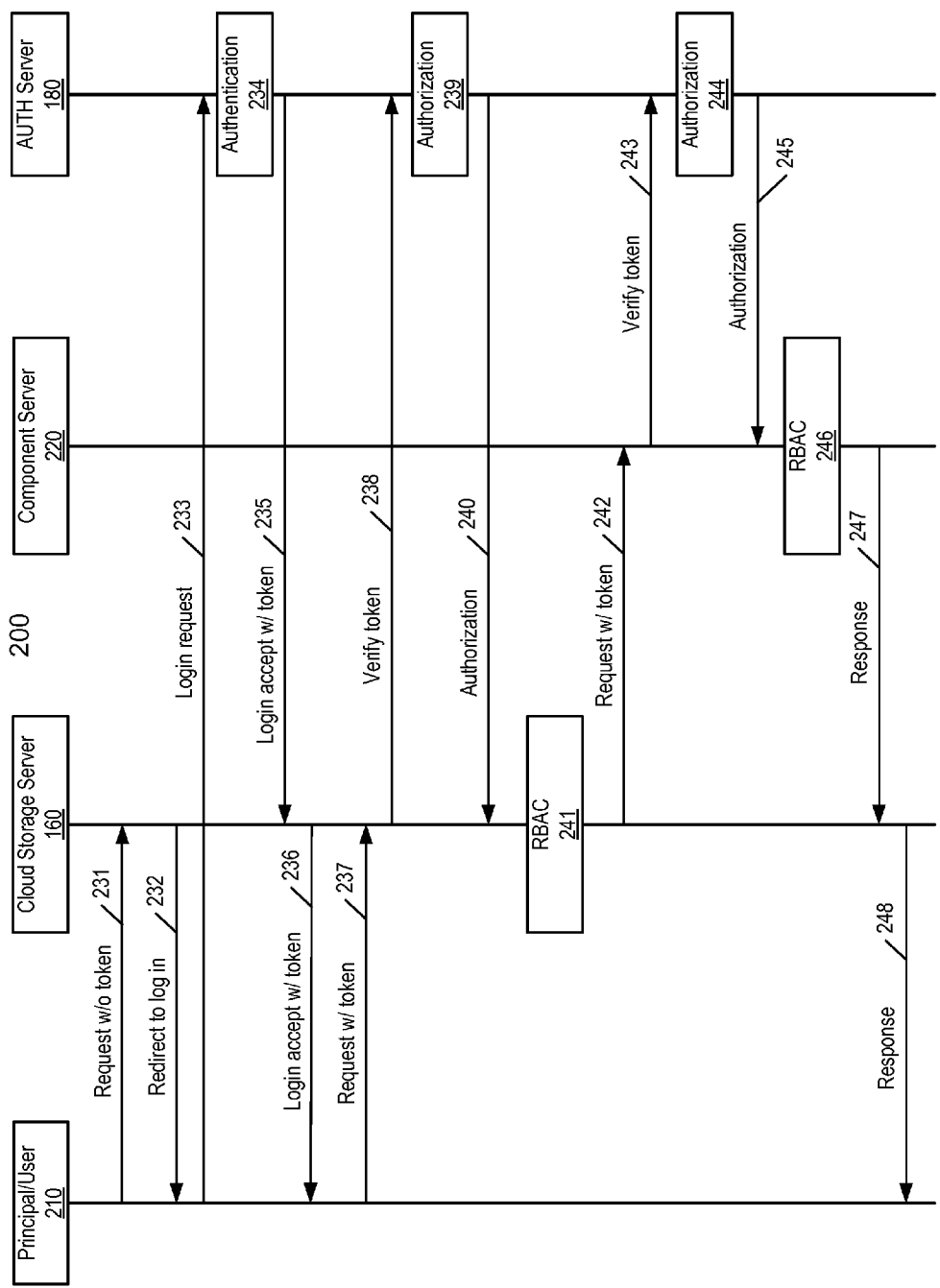
FIG. 2 is a transactional diagram illustrating an authentication/authorization process according to one embodiment of the invention.

FIG. 2 is a transactional diagram illustrating an authentication/authorization process according to one embodiment of the invention. For example, authentication and authorization process 200 may be performed by authentication/authorization system 100 in a multi-tenant environment. Referring to FIG. 2, process 200 includes, but is not limited to, principals/users 210 communicatively coupled to cloud storage server 160, component server 220, and AUTH server 180 via a bus/and our a network. In one embodiment, cloud storage server 160 receives an access request from user 210 via transaction 231 to access a resource to perform a set of particular operations within a particular tenant (i.e., roles). In one embodiment, in response to the access request from the user 210, cloud storage server 160 redirects the request via transactions 232 and 233 to request AUTH server 180 to authenticate the access request.

Further, in response to receiving the access request, at block 234, AUTH server 180 is configured to determine whether to allow or deny an authentication request (i.e., an access request to login) based on information contained in the authentication request and AUTH server store (not shown). In one embodiment, each authentication request includes credentials of a user. The credentials of the user include, but are not limited to, a user name and a password, wherein each user name and password identifies a requesting user (i.e., the user that sent the access request message). The credentials further contain a tenant identifier (ID) such as a tenant name (e.g., Tenant C), on which the requested access is to be performed. The credentials further include a domain ID such as a domain name (e.g. @DomainA, @DomainC, or @DomainIT) which identifies an identity source or identity provider (e.g., identity provider server 170 or local identity provider) associated with a particular tenant. It should be understood that the principals/users and tenants in the system have each been assigned a unique secured ID (SID).

According to one embodiment, AUTH server 180 processes the authentication request to allow or deny access to the user. For example, AUTH server 180 authenticates the authentication request by validating the credentials of the user that initiated the request by looking up the AUTH server store. The AUTH server 180 determines whether the user 210 is validated/authenticated to access the requested tenant by looking up the AUTH server store to determine that the user 210 is authenticated to access. For example, AUTH server 180 uses the specified credentials of the user to lookup the associated credentials in the AUTH server store. As used herein, "specified credentials" refer to a combination of one or more of the user ID, password, tenant ID, and domain ID, which are provided by the user (e.g., as part of a login process or as part of the authentication request itself).

AUTH server 180 then uses the specified credentials to determine if the specified credentials match the associated credentials contained in the AUTH server store. It should be understood that a "match" refers to a user name, a password, a tenant name, and a domain name (i.e., the associated credentials) in the AUTH server store matching respectively the user name, the password, the tenant name, and domain name (i.e., the specified credentials) that were derived based on the authentication request. Thus, if the associated credentials in the AUTH server store do not match the specified credentials that were derived from the authentication request, then there is a mismatch and the requesting user is denied access.

According to one embodiment, AUTH server 180 processes the specified credentials of the authentication request, and if there is a match (i.e., successful), forwards the request with an access token (e.g., a Security Assertion Markup Language (SAML) token) to cloud storage server 160 for the requesting user via transaction 235, which forwards the token to user 210 via transaction 236. In one embodiment, the access token is associated to a unique hash that identifies a particular AUTH session associated with the requesting user as an authenticated user in the system (described in further details below). As used herein, an "authenticated user" refers to any requesting user that obtains an access token from an AUTH server (e.g., AUTH server 180).

According to one embodiment, subsequently user 210 may use the access token to request access to a particular resource of cloud server 160 via transaction 237. In response to receiving the access token associated with the authenticated user, cloud storage server 160 then determines whether to allow or deny a resource request from the authenticated user for accessing a particular resource (e.g., a data file, an object, a workflow, etc.) associated with a particular tenant (e.g., tenant 162) stored in a file storage (e.g., file storage 164). Further, in response to an authorization request, cloud storage server 160 transmits the access token to AUTH server 180 to validate the access token associated with the authenticated user via transaction 238. As used herein, an "authorization request" refers to a request from a cloud storage server to an AUTH server to determine whether an access token is validated.

According to one embodiment, AUTH server 180 is configured to authorize the authorization request by determining whether the access token is validated (i.e., the access token is not revoked and expired) at block 239. In response to determining the access token is validated, AUTH server 180 identifies a set of one or more tenants associated with user. For each tenant associated with the user, AUTH server 180 further determines a set of one or more roles within each tenant (i.e., a user may be associated with multiple tenants, and assigned multiple roles within different tenants). Further, for each role of the user within each tenant, AUTH server 180 determines a set of one or more privileges associated with each role.

These roles and privileges are referred to as user roles and user privileges because they are part of the static access control settings. In one embodiment, during the operations in block 239, an AAP associated with a client application hosted by cloud storage server 160 may be examined to determine any application roles and application privileges specified therein. Such application roles and application privileges may be dynamically configured by an administrator associated with the client application and maintained by AUTH server 180. If there is any user access control parameter and application access control parameter that are matched, the information of the application access control parameters will override the user access control parameters. For example, if a user role of the static settings matches with an application role defined in an AAP, user privileges of the user role may be replaced with the corresponding application privileges of the matching application role as described above.

Furthermore, according to one embodiment, a TAP associated with a tenant whose resources to be accessed may also be examined for dynamic access control. Similar to the dynamic configuration of an AAP, the user roles and user privileges are matched with the tenant roles and tenant privileges. For any user role that matches a tenant role defined in the TAP, the associated user privileges are replaced with the tenant privileges of the matched tenant role.

In one embodiment, in response to the authorization request, AUTH server 180 processes the authorization request, and if validated (i.e., access token is not revoked and expired), generates/transmits an AUTH token to cloud storage server 160 via transaction 240 to allow the requested client to determine whether the user is allowed to access the particular resource within that particular tenant. For example, AUTH server 180 generates/transmits the AUTH token (e.g., SAML token) which includes, but is not limited to, the set of one or more tenants associated with the user, the set of one or more roles with each tenant, and the set of one or more privileges of each role (described in further detail below). In one embodiment, information associated with each tenant may be encrypted by a specific encryption key associated with the corresponding tenant. As a result, only a proper component associated with the tenant would have the necessary key to decrypt the information of the access token.

In one embodiment, in response to receiving the AUTH token, at block 241 cloud storage server 160 is configured to determine whether to allow or deny an authenticated/authorized user to access the particular resource within that particular tenant based on information contained in the AUTH token associated with that user. As used herein, an "authenticated/authorized user" refers to a user associated with an AUTH token that was authenticated and authorized by an AUTH server to access one or more tenants. According to one embodiment, cloud storage server 160 determines whether to allow or deny the authenticated/authorized user access by extracting and/or decrypting information from the AUTH token. Continuing on with the above example, cloud storage server 160 extracts information from the AUTH token which includes, but is not limited to, the set of one or more tenants associated with the authenticated/authorized user, the set of one or more roles with each tenant, and the set of one or more privileges of each role that are authorized to the authenticated/authorized user.

According to one embodiment, cloud storage server 160 retrieves a first tenant and a first role allowed to access the particular resource from a RBAC database associated with the requested client. Cloud storage server 160 further retrieves an access privilege, which includes a type of access (e.g., read, write, delete, etc.) authorized for the particular resource, from the RBAC database. Cloud storage server 160 then determines whether the AUTH token contains the first tenant, the first role, and the authorized access privilege obtained from the RBAC database. If so, cloud storage server 160 allows the user 210 to access the particular resource (i.e., the requested resource) and implement the access privilege (e.g., read/write) authorized for the particular resource.

In one embodiment, cloud storage server 160 may transmit the AUTH token associated with the user 210 to component server 220 (e.g., another component or tenant) via transaction 242, which may be involved with a new authorization request. For example, if other tenants or clients are involved with the new authorization request, cloud storage server 160 transmits the AUTH token to each involved tenant/client (e.g., component server 220) to validate/authorize the AUTH token for each authorization request. Continuing on with the example, component server 220 receives the AUTH token and transmits the AUTH token to AUTH server 180 for validation via transaction 243, which is validated by AUTH server 180 at block 244.

In one embodiment, during the validation operations at block 244, the access control information contained in the token received from component server 220 may be examined in view of the associated AAP and/or TAP again. As described above, the access control information or settings may be configured dynamically by an administrator at any time. For example, an AAP and/or TAP may validate the access control settings in the token at block 239. However, between the time of operations at block 239 and block 244, the AAP and/or TAP may be dynamically modified by an administrator. It is possible that by the time the token is received at block 244, the previously validated access control settings become invalid, restricted, or expanded, etc.

Note that component server 220 may only be able to decrypt and extract a portion of the information stored in the AUTH token using a specific encryption key, where the key may be a different key possessed by clod server 160. That is, cloud server 160 and component server 220 may only be entitled to access different portions of the AUTH token since different portions may be encrypted with different encryption keys. If the AUTH token is validated again via transaction 245, component server 220 is to determine whether to allow or deny the user to access a new resource within the respective component at block 246. If the user is authorized to access the new resource within the respective component, component server 220 allows the user to access the new resource and implement the access privilege (e.g., read/write/delete) authorized for the new resource. A response is then transmitted back to cloud server 160 via transaction 247, which is then forwarded to user 210 via transaction 248. As a result, with a single login, a user can access the same or different tenants with different roles and different privileges of each role using the same AUTH token.

FIG. 3 is a block diagram illustrating an example of an access control list (ACL) database according to one embodiment of the invention. In this example as shown in FIG. 3, the ACL database includes one or more ACLs, and each ACL includes one or more access control entries (ACEs). The illustrated block diagram is a table, but another block diagram may work equally well, such as a list, a map, and a rational database. The table contains one or more ACEs, each ACE including a resource ID, a tenant ID(s), a role ID, and a privilege ID(s) to be utilized by a component (e.g., a client) to determine whether a user is allowed to access a resource associated with a particular tenant.

In one embodiment, ACE 1 is associated the following items: "ABC" resource, "Tenant C" tenant, "Operator" role, and "VIEW_EMAIL" privilege. For example, a first user with a first AUTH token which matches the items from ACE 1 is allowed to read emails for "ABC" resource within the "Tenant C" tenant as the "Operator" role that is associated with the first user. Further, ACE 2 is associated the following items: "ABC" resource, "Tenant C, Tenant B" tenants, "Email Admin" role, and "VIEW_EMAIL, DELETE_EMAIL" privileges. For example, a second user with a second AUTH token which matches the items from ACE 2 is allowed to read emails for "ABC" resource (i.e., the same "ABC" resource from ACE 1) within the "Tenant B" tenant as the "Email Admin" role that is associated with the second user. Continuing on with the above example, the first user may only read emails for "ABC" resource, while the second user may read emails for "ABC" resource and delete emails for "ABC" resource. In one embodiment, to determine whether a user is entitled to access a particular resource, ACL module 130 decrypts and extracts authorization information from the AUTH token and compares the information with the ACL information corresponding to the resource being accessed in the ACL database 150 as shown in FIG. 3. If the authorization information from the AUTH token matches the ACL information of the resource being accessed, the user will be allowed to access the resource. Otherwise, the user will be denied.

ACL database 180 may be implemented in a storage system such as cloud storage server 160 or any component which may perform/manage access control (e.g., RBAC components). It should be understood that a user may be associated with multiple ACEs which authorizes the user to have multiple roles within multiple tenants. Of course, the block diagram for illustrating an example of an ACL database may include additional and/or different parameters.

Figure 4:
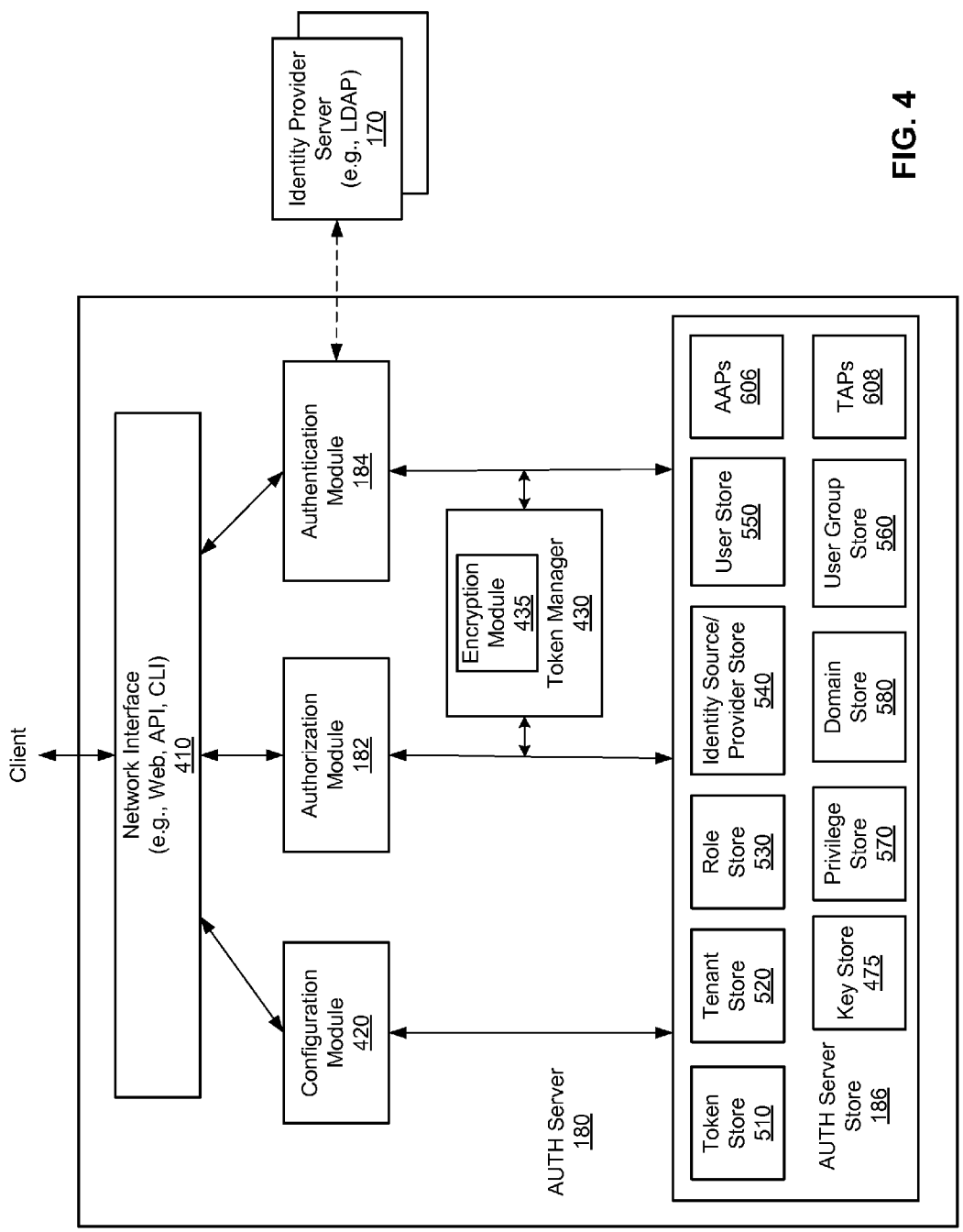
FIG. 4 is a block diagram illustrating an authentication/authorization system according to one embodiment of the invention.

FIG. 4 is a block diagram illustrating an authentication/authorization system according to one embodiment of the invention. FIG. 4 shall be described with reference to the example illustrated in FIG. 2. Referring now to FIG. 4. In one embodiment, AUTH server 180 includes, but is not limited to, user interface 410 communicatively coupled authentication module 184, authorization module 182, configuration module 420, token manager 430, and AUTH server store 186.

In one embodiment, AUTH server 180 includes user interface 410 configured to receive one or more access requests from one or more clients using the Remote Procedure Call (RPC), Hypertext Transfer Protocol Source (HTTPS), Representational State Transfer (REST) protocol, or any combination thereof. Here, an access request includes, but is not limited to, an authentication access request (also referred to as an authentication request), an authorization data access request (also referred to as an authorization request), or configure data access request. Here, an authentication access request refers to a request to perform a verification operation on a user (e.g., client), who attempts to log in to a tenant. User interface 410 processes the authentication access request, if the user has not been authenticated, and forwards the request to authentication module 184 after removing at least some of the networking stack related information from the request. Authentication module 184 receives the request from the user and verifies the identity of the user in any one or more identity provider components (e.g., identity provider server 170, identity source/provider 540). Authentication module 184 processes the request and verifies/authenticates the request by, for example, validating credentials of the user that initiated the request by looking up AUTH server store 186.

In one embodiment, each authentication request includes, but not limited to, a user ID (e.g., username), a password, a tenant ID, and/or a domain ID (i.e., the credentials of the user). Authentication module 184 determines whether the user is authenticated to access the requested tenant (e.g., the tenant ID provided as part of the login process or as part of the request itself) by looking up AUTH server store 186 to determine whether the credentials of the user identify/match a user (e.g., user 550) within AUTH server store 186, and determine which tenant(s) the user is allowed to access. For example, authentication module 184 uses the specified tenant ID and specified domain ID to look up the associated tenant ID (e.g., tenant 520) and associated domain ID (e.g., domain 580) in the AUTH server store 186. Then, an identity source/provider (e.g., identity/source provider 540) uses the specified user ID and specified password to verify/authenticate the identity of the user (e.g., user 550) associated with the obtained domain ID. In one embodiment, a particular identity source/provider (e.g., identity/source provider 540) may be associated with one or more domain IDs (e.g., domain 580) within one or more tenant IDs (e.g., tenant 520), which allows the user to provide one or more specified tenant names and corresponding specified domain names to authenticate/log in within one or more associated tenant IDs. By way of example, these associated IDs identify the tenant(s) that the user is allowed to access.

In one embodiment, authentication module 184 compares the credentials of the user (e.g., user ID, password, tenant ID, and domain ID) against the IDs obtained/contained in AUTH server store 186. By way of example, authentication module 184 may determine that the specified user name matches the user ID (e.g., the associated/determined user ID)

contained in AUTH server store 186, which is associated with the ID contained in user 550. Further, authentication module 184 determines that the specified tenant ID (also referred to as requested tenant) matches the tenant ID contained in AUTH server store 186, which is associated with the ID contained in tenant 520. Further, authentication module 184 determines that the specified domain ID matches the domain ID contained in AUTH server store 186, which is associated with the ID contained in domain 580, respectively. Authentication module 184 determines that the specified password matches the password contained in AUTH server store 186. If there is a match for each credential of the user, authentication module 184 determines that the user is authenticated/granted to access the specified tenant. If there is at least one that does not match, authentication module 184 then denies access to the requesting user. In alternative embodiment, identity provider server 170 verifies the credentials of the user and forwards an external authentication of the user to authentication module 184. Note that block 170 is optional because a client can be authenticated by the existence of the authentication module and AUTH server store. Also note that, according to this embodiment, authentication module 184 identifies the specified tenant ID and then the specified domain ID, which are located in AUTH server store 186, while an external identity provider server (e.g., identity provider server 170) then identifies the user with the specified user ID and verifies the specified user ID with the specified password.

In response to determining the user is authenticated to access the specified tenant, authentication module 184 forwards the authentication request to token manager 430. In one embodiment, token manager 430 is responsible for receiving one or more authentication requests and generating access tokens to identify users that are authenticated by authentication module 184 (or identity provider server 170). Here, a token manager is configured to generate one or more access tokens and validate access tokens (e.g., as part of an authorization request) by determining whether an access token is expired and/or revoked. As used herein, an "access token" may refer to a unique hash that identifies authentication of a requesting user. The access token can be used as a reference ID to obtain an AUTH token (described in further detail below). In one embodiment, token manager includes, but is not limited to, a hash table identifying one or more authenticated users. When an access token is received, token manager 430 hashes at least a portion of the access token and compares the hash of the access token with hashes stored in the hash table (not shown). If the hash of the access token is found in the hash table, it means that the user has been previously authenticated. In one embodiment, if the user has not been authenticated or previous authentication expired, its hash would not be or would be removed from the hash table. Continuing on with the above example, token manager 430 processes the authentication request, and after a successful authentication, generates an access token for the requesting user. In response to the successful authentication, token manager 430 forwards the access token to authentication module 184, which forwards the access token to user interface 410. User interface 410 transmits the access token to the user which allows the user to access (i.e., log into) the requested tenant.

In one embodiment, AUTH server 180 includes user interface 410 configured to receive one or more authorization data access requests from one or more clients using the Remote Procedure Call (RPC), Hypertext Transfer Protocol Source (HTTPS), Representational State Transfer (REST) protocol, or any combination thereof. Here, an authorization request includes, but is not limited to, a data access request from an authenticated user, an access token from the authenticated user, and/or a request to determine which role(s) are assigned/authorized to the user within a requested tenant (e.g., the tenant specified/authenticated at the login process) and/or one or more child tenants of the requested tenant. Here, a data access request can be a read, write, delete, and/or replicate request.

User interface 410 processes the authorization request, if the user is authenticated, and forwards the authorization request with the access token of the authenticated user to authorization module 182. Authorization module 182 receives the request from the user and validates the access token by verifying that the access token is not expired and revoked, for example, by token manager 430. In one embodiment, token manager 430 is invoked to verify whether a particular token is still valid, for example, by comparing the hash of the access token with the corresponding one in the hash table. In response to the validated access token, authorization module 182 determines whether the user is authorized to access the data by looking up AUTH server store 186 to determine which roles(s) the user is authorized to perform.

For example, authorization module 182 uses the validated access token to obtain a user ID obtained in AUTH server store 186 by looking up the specified user name provided by the user as part of the login process or as part of the request itself. Authorization module 182 then uses the user ID to obtain one or more associated tenant IDs (e.g., tenant 520) from AUTH server store 186. By way of example, the one or more associated tenant IDs refer to the specified tenant provided by the user and, if the specified tenant is a parent tenant, one or more child tenants associated with the specified tenant. Authorization module 182 then uses the tenant IDs to obtain one or more associated role IDs (e.g., role 530) from AUTH server store 186. Further, authorization module 182 uses the one or more role IDs to obtain one or more associated privilege IDs (e.g., privilege 570) from AUTH server store 186. These associated IDs identify the roles and privileges that the user is authorized to perform within the specified tenant (identified at the user's login) and/or the child tenants of the specified tenant.

In response to determining the authorized roles and tenants, authorization module 182 forwards the authorization request to token manager 430. In one embodiment, token manager 430 is responsible for receiving one or more authorization requests, generating one or more AUTH tokens, and encrypting the one or more AUTH tokens (described in further detail below). Continuing on with the above example, token manager 430 processes the authorization request and generates an AUTH token based on information identifying one or more tenants associated with the user, one or more roles of the user with each tenant, and one or more privileges associated with each role. Further, encryption module 435 then encrypts the information into one or more encrypted blocks in the AUTH token using one or more public keys that are associated with one or more tenants (described in further detail below). Encryption module 435 then encapsulates the one or more encrypted blocks in the AUTH token. In response to encapsulating the encrypted blocks, token manager 430 forwards the encrypted AUTH token to authorization module 182 and then authorization module 182 forwards the encrypted AUTH token to user interface 410. User interface 410 transmits the encrypted AUTH token to the client to allow the client to determine whether the user is allowed to access a requested resource based on the AUTH token. Note that a tenant associated with an AUTH token is required to have a corresponding private key to decrypt an encrypted block allocated to the tenant.

In one embodiment, AUTH server 180 includes user interface 410 configured to receive one or more control access requests from one or more clients using the Remote Procedure Call (RPC), Hypertext Transfer Protocol Source (HTTPS), Representational State Transfer (REST) protocol, or any combination thereof. Here, a control access request refers to a request to perform an operation on an object. An operation includes, but is not limited to: 1) creating new roles in particular tenants, 2) configuring privileges, 3) creating/generating/accessing role assignments (including role and user information), 4) configuring namespaces and policies, 5) listing the objects associated with a tenant, 6) listing the ACEs/ACLs that are associated with the objects that are associated with a tenant, 7) associating/disassociating objects with/from a tenant, and 8) listing the users/groups associated with a tenant, 8) associating/disassociating users/groups with/from a tenant.

The definition of an object depends on the operation that is being requested. For example, an object can be a: 1) file system AUTH object (FSAO) (where a FSAO refers to a unit of storage allocation that presents a unique and self-contained namespace for a tenant, each tenant can be allocated one or more FSAOs, and each object is assigned with the ownership of an authenticated principal that created the object), 2) policies (where a policy refers to a set of object ACLs for one or more namespaces of a tenant, and these policies are applied when no parent object is specified during the object creation and the parent ACLs may not be inherited), and 3) user/group user/group (where a user can be a local user (e.g., user definitions stored in the storage system operating system), or name-service user (e.g., Active Directory (AD), Network Information Service (NIS), etc.); users can be classified as either configuration-users (i.e., admins who perform control/configure/manage operations), or as data-access users (i.e., users who only access data); note that groups may be defined in some name service such as AD, NIS, wherein the same groups can be associated with a tenant with the roles of tenant-admin/tenant-user; if any user logs in to the system which is part of such a group, that user will have the assigned tenant-admin/tenant-user role.

In one embodiment, in order to provide security and isolation, the control operations which may be performed by the requesting user depends on the role associated with the requesting user. For example, while a system admin may perform all operations, an operator user (also referred to as a tenant user) may be allowed to perform only a subset of the operations and/or subset of the objects that are available to the tenant admin. The operations which are available to the roles are defined through the AUTH server store 186, described in further details below. In response to a control access request, user interface 410 determines whether the user is authenticated to perform the control access request. User interface 410 processes the request if the user is authenticated, and forwards the request to configuration module 420. Configuration module 420 determines whether the requesting user is authorized to perform the requested operations on the object based on AUTH server store 186.

According to one embodiment, configuration module 420 determines the roles of the requesting user, for example, by deriving the AUTH token of the user or by using the specified user name to lookup AUTH server store 186. If configuration module 420 determines that the requesting user has a required role to perform the requested operations, configuration module 420 grants the request of the requesting user. If not, configuration module 420 denies the request. After determining that the user is authorized to perform the requested operation, configuration module 420 determines whether the user is authorized to access the object on which the requested operation is to be performed. Configuration module 420 may invoke authentication module 184 and/or authorization module 182 to determine whether a particular user is entitled to modify the information stored in the AUTH server store.

Note that each of stores as shown in FIG. 4 may be maintained via one or more databases or data structures and managed by one or more management logic. In one embodiment, token store 510 stores tokens of specific access sessions of specific users, which may be manage by token manager 430. Tenant store 520 stores tenant objects representing a variety of tenants, which may be managed by a tenant manager (not shown). Role store 530 stores roles object represent a variety of roles, which may be managed by a role manager. Identity source/provider store 540 may be managed by an identity manager or identity provider. Identity source/provider store 540 stores identity source objects each specify an identity provider used to authenticate a particular user. User store 550 stores user objects representing a variety of users, which may be managed by a user manager. Key store 475 stores encryption keys (e.g., public keys of key pairs) for encrypting different sections of an AUTH token, which may be managed by a key manager. Privilege store 570 stores privilege objects presenting various privileges, which may be managed by a privilege manager. Domain store 580 stores domain objects representing various domains, which may be managed by a domain manager. User group store 560 stores user group objects representing different user groups, which may be managed by a user group manager. These managers may be invoked by configuration module 420, authorization module 182, and authentication 184 for accessing their respective objects of their respective stores. Modules 420, 182, and 184, as well as the managers described above may be loaded in a memory (e.g., random access memory or RAM) and executed by one or more processors of AUTH server 180. Store 186 may be maintained and stored in a persistent storage device such as a hard disk or storage appliance associated with AUTH server 180.

In one embodiment, in order to determine whether the user is authorized to access the requested object, configuration module 420 or authorization module 182, for example, derives the AUTH token to obtain the tenant IDs that are associated with the user, or uses the user ID (associated with the specified user name) to lookup AUTH server store 186 to obtain the tenant IDs that are associated with the user. The tenant IDs obtained identify the tenant that can be accessed by the associated user. Configuration module 420 uses these obtained tenant IDs to access AUTH server store 186 to determine the corresponding object types as the object on which the operation is to be performed. After the configuration module 420 determines the required information (e.g., the determined: tenant, role, privilege, and user) to access the requested object, configuration module 420 performs RBAC to then determine whether the user is authorized to access the requested object. If so (e.g., the information derived from the user's AUTH token matches the required role, privilege, user, and, tenant to access the requested object), configuration module 420 grants the user access to the requested object. If not, configuration module 420 denies the request.

In one embodiment, AUTH server store 186 includes, but is not limited to, token store 510, tenant store 520, role store 530, identity source/provider store 540, user store 550, user group store 560, key store 475, privilege store 570, and domain store 580 (each object is described in further detail below). According to one embodiment, key store 475 is responsible for storing information identifying one or more keys associated with one or more tokens contained in token store 510. Key store 475 is also responsible for storing one or more pubic keys associated with one or more tenants contained in tenant store 520, and each public key corresponds to a private key maintained by each tenant contained in tenant store 520. Note that some or all of the components shown as part of AUTH server 180 in FIG. 4 may be implemented in software, hardware, or a combination thereof. For example, some or all of the shown components may be implements in a form of executable instructions that can be stored in a machine-readable storage medium, which when executed, loads the components into an operation system of AUTH server 180. Some or all of the components in FIG. 4 may also be stored as part of a persistent storage device. For example, AUTH server store 186 may be stored as part of a persistent storage device, and loaded into memory during operation.

In one embodiment, the access control settings stored in stores 475-580 are referred to as static or permanent access control settings. AUTH server store 186 further maintains AAPs 606 for a variety of applications and TAPs 608 for a variety of tenants. AAPs 606 store any dynamic access control information associated with particular applications. TAPs store any dynamic access control information associated with particular tenants. Once the static access control information has been identified based on the static access control settings, the dynamic access control settings defined in AAPs 606 and/or TAPs 608 may be used to substitute or modify (e.g., restrict, expand, addition) the static access control settings. The modified access control settings are used to generate the token. AAPs 606 and TAPs 608 provide dynamic definitions which would provide the ability to dynamically define a user's capabilities. The dynamic definitions could be controlled by time, geographic location, application, etc. An example of this would be the temporary elevation of a user's capabilities to application administration while the current application administrator is on vacation.

Figure 5:
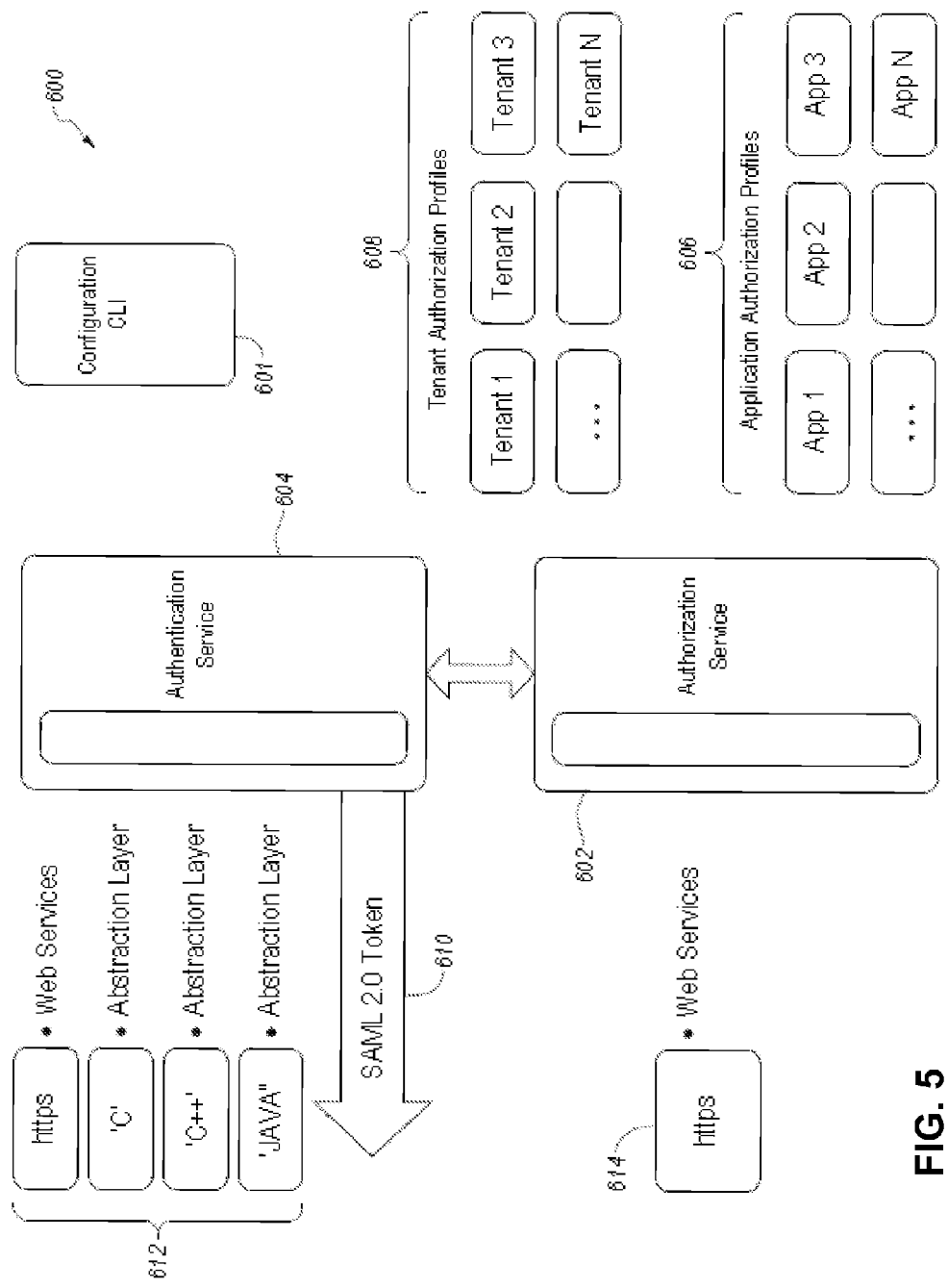
FIG. 5 is a block diagram illustrating an authorization system according to another embodiment of the invention.

FIG. 5 is a block diagram illustrating an authorization system according to another embodiment of the invention. System 600 may represent the system as shown in FIG. 4. With reference now to FIG. 5, further details are provided concerning aspects of an example authentication and authorization (A/A) architecture, denoted generally at 600. Part or all of the A/A architecture 600 can be in the form of code stored on non-transitory storage media and executable by one or more physical processors or other devices. As shown in FIG. 5, the A/A architecture 600 includes, or operates in connection with, a configuration command line interface (CLI) 601 that enables an administrator or other personnel to configure the A/A architecture 600. An authentication service 602 of the A/A architecture 600 interacts with an authentication service 604. The authorization service 602 has access to one or more application authorization profiles 606, each of which is specific to a particular application, or version of an application, as the case may be. The authorization service 602 also has access to one or more tenant authorization profiles 608, each of which is specific to a particular tenant of a tenant environment.

In general, the outcome of the authorization workflow performed by way of the A/A architecture 600 will be a token 610, such as a SAML token for example, that is generated by the authentication service 604 and provides a vehicle for an application to enforce access control. The token 610 can be used securely via consuming applications, that is, applications that employ the token to perform authentication of authorized users. Thus, and as discussed below, the token 610 provides the application with an understanding of the user, the Lightweight Directory Access Protocol (LDAP) groups of the user, and the application roles of the user. The scope and content of the token 610 can change dynamically dependent upon the application authorization profiles 606 and the tenant authorization profiles 608, discussed elsewhere herein.

For example, the SAML token can be extended to provide the authorization details, including extensions such as, but not limited to, any one or more of the application, the application version, LDAP Groups (a user can be associated with multiple LDAP Groups), application role, and application role opaque object. The SAML token can contain multiple distinct blocks of this information. In this way, the authorization service 602 can support multiple versions of the same application, or even different applications. In at least some embodiments, a token 610 such as an SAML token, is the sole mechanism for providing authentication/authorization information to applications within an operating environment, one example of which is the environment associated with the EMC Enterprise V2 application. An application receiving the token 610 can verify that the token 610 is valid and/or is not required. As also discussed immediately below, the token 610 can be utilized in different ways depending upon the authentication service 602 that is provided.

The authorization service 602 is application unaware, that is, not configured for use with specification applications, or application specific. However, the authorization service 602 becomes application aware through the use of the application authorization profiles 606. These application authorization profiles 606 provide a vehicle for using an authentication/authorization request from a user to provoke a corresponding response from an application that the user has requested to access.

In general, the authentication service 602 will provide the authorization service 604 with a set of user characteristics to authorize. An example set of user characteristics may include, but is not limited to, a Username, and a set of LDAP groups to which the user belongs. Additional, or alternative, characteristics can be employed however.

The membership of a user in one or more LDAP groups may reflect certain queries and other operations that the user has performed and which are therefore indicative of the need of that user to have access to one or more particular applications. LDAP group information is also useful as LDAP can be used to assign a privilege, such as application access, to a group of users. Finally, LDAP can be used to store user credentials in a network security system, and the credentials can be retrieved with a password and decrypted key, thus enabling the user to various services. The use of LDAP groups as a user characteristic is not required however and additional, or alternative, information can be used as well.

In any event, once the authorization service 602 has received the user characteristics information, the authorization service 602 will then attempt to match the provided user characteristics to the roles defined in the application authorization profiles 606. For each match, the authorization service 602 will extract the application role and application role privilege mask. When all of the application authorization profiles 606 have been searched, the set of matching application roles and privilege masks will be returned by the authorization service 602 to the authentication service 604, thereby identifying the authorized user(s) to the authentication service 602.

The authentication service 604 then places the received information in the SAML, or other, token to be returned to the application. In this way, a user may be granted access to one or more applications based on a match between his user characteristics and the application roles defined in the application authorization profiles 606. This approach to access control may be referred to herein as Role Based Access Control (RBAC). More specifically, the ability of a user to perform one or more actions with respect to an application, or one or more particular elements of an application, is dictated by the privileges, that is, role, associated with that user. Enforcement of the role is an application-specific task that is carried out by the particular application(s) implicated by the actions that the user wishes to perform.

As noted elsewhere herein, the A/A architecture 600 may provide for dynamic authorization (DA) which, in general, refers to the notion that the privileges granted to a user are not static and can be changed at any time. Thus, an administrator or other personnel could dynamically define and/or modify, as applicable, the privileges granted to a particular user. The definition of the privileges granted could be controlled, for example, by any of a variety of different variables or groups of variables, including time, location, or application. As well, provision may be made for identifying any conflicts in user privileges, and then resolving any such conflicts according to default or other rules and values.

For example, the privileges of a user with respect to certain applications could be revoked if the user no longer required access to those applications. As another example, the privileges of users in certain physical locations or business units may be modified to reflect moves and reassignments. As a final example, user privileges could be assigned for a set duration of time, and then automatically expire at the end of the time period.

As noted earlier herein, the A/A architecture 600 supports the implementation of tenant environments that may span multiple servers, or include multiple tenants in a single server. Accordingly, another variable that can be used in connection with a DA process is the association of a particular user with a tenant and/or tenant environment. For example, upon association of a user with a tenant or tenant environment, the privileges of that user can be modified to reflect the access rights associated with that tenant or tenant environment.

Finally, FIG. 5 indicates that the authentication service 604 can be configured and modified using a variety of different programming languages 612, and/or using https. Such languages include, but are not limited to, 'C,' 'C++,' and Java, and the configuration of the authentication service 604 can take place by way of an abstraction layer, or web service in the case of https. In similar fashion, the authorization service 602 can be configured and modified using, for example, https 614 and web services, although other programming mechanisms could alternatively be employed.

With continued attention to FIG. 5, and directing attention now to FIG. 7A as well, further details are provided concerning example embodiments of application authorization profiles. As noted elsewhere herein, the authorization service 602 is generic, or application-unaware, in the sense that the authorization service 602 is not configured or constrained for use with any particular application, version of an application, or group of applications. However, the authorization service 602 is able to carry out processes that do relate to particular applications. This functionality of the authorization service 602 is enabled by the application authorization profiles 606.

Through the use of multiple application-specific application authorization profiles 606, a single authorization service, such as the authorization service 602, is able to provide authorization services for multiple applications. Any number of application authorization profiles can be employed so there is no limit to the flexibility of the authorization service 602. Thus, multiple users of multiple applications and/or versions of applications can be authorized by way of a single authorization service.

Initially, an application provides an application authorization profile 606 to the authorization service 602. In at least some embodiments, the application authorization profile 606 can be specific to a particular version of the application, although that is not necessarily required. The authorization service 602 then registers the received application authorization profile 606. Where multiple instances of an application are operating in an environment, only a single application authorization profile 606 need be provided to the authorization service 602 for that application, or version.

For example, if an instance of an application attempts to register a corresponding application authorization profile 606 with the authorization service 602, and an application authorization profile 606 for another instance of that application or version has already been registered, the authorization service 602 will notify the instance of the application that is attempting registration that an application authorization profile 606 already exists for that application or version. Thus, even if multiple instances of an application are operating, only a single application authorization profile 606 is needed for that application. Moreover, because an application authorization profile 606 can be registered for each version of an application, the authorization service 602 is able to maintain backwards compatibility with respect to relatively older versions of the application.

As noted elsewhere herein, application authorization profiles 606 can include any suitable type, or types, of information. In general, some embodiments of the application authorization profiles 606 operate as a vehicle to enable an administrator or other authorized user to map one or more user groups, such as LDAP groups for example, to one or more application roles included in, or at least identified by, the application authorization profiles 606. In at least some embodiments, the mapping is not provided via the application authorization profile itself, since mapping implicitly requires knowledge of the LDAP Groups within the organization and how those LDAP Groups will map to the application roles. Rather, in these example embodiments, the application authorization profile provides a template for the application roles but it is the authentication/authorization administrator who defines the mappings and usage of the application roles.

With specific reference to one example, the authorization service 602 may require a mapping of LDAP groups to the application roles to be performed. After an application has registered its profile with the authorization service 602, an appropriate user with an authorized role, such as a security or IT administrator for example, would then update the LDAP groups-to-application role mapping. In some embodiments at least, the application administrator could be prevented from involvement in the mapping process.

Each application role, in turn, is associated with a respective privilege mask which defines particular privileges that can be granted with respect to that application upon authentication of an authorized user in the user group(s). In this way, each application role is defined to include certain privileges, and an application authorization profile 606 can thus be used to associate one or more users with those privileges.

In one example embodiment, an application authorization profile 606 includes information that identifies the application and application version to which the application authorization profile 606 applies, and the application authorization profile 606 also includes information that includes a list of application roles. As indicated in FIG. 4a, in some embodiments, one or more of the application roles 616 may define a corresponding Application Role Opaque Object (AROO) 618, which may take the form of a privilege mask and/or other information specific to the application identified in the application authorization profile 606. In general, the nature of an opaque object 618, such as the AROO, is such that complete information about it may only be accessible or available to certain users, such as an administrator for example, even though the existence and other properties of the opaque object 618 may be apparent to users other than administrators as well. As further indicated in FIG. 4a, a particular application and version may be associated with a plurality of different application roles 616.

While the preceding discussion has focused on application authorization profiles, further details are provided now concerning example embodiments of tenant authorization profiles. As noted earlier, for example, tenant environments may be defined that are limited to a particular tenant, or group of tenants, and which enable access only to certain elements or aspects of one or more applications. Such access by the tenant(s) can be controlled by a tenant administrator using one or more tenant authorization profiles, such as the tenant authorization profiles 608 disclosed in FIG. 5 for example.

In general, the definition and use of tenant authorization profiles 608 enable tenant administrators the ability to manage and define their own authorization, that is, within the tenant environment, without requiring authorization/authentication service provider administrator involvement. This approach also enables tenant administrators to exclude service provider administrators from being able to modify a tenant authorization profile 608 and thus confers a certain degree of autonomy on the tenant administrator.

A tenant authorization profile 608 can be configured in any suitable manner and the scope of the invention is not limited to any particular type or configuration of tenant authorization profile 608. Nonetheless, at least some example tenant authorization profiles 608 can be configured to enable control of tenant access on one or more bases, or combinations of bases, including exclusion of a particular user or users, time-based restrictions that limit when a user or users can access certain elements or aspects of particular applications, restrictions based on user locations such as geographical and/or business unit locations, and restrictions based on changes to the roles of one or more users. Any other suitable bases could also be used by a tenant administrator to restrict access to certain elements or aspects of one or more applications embraced by a tenant environment. Following are some example use cases for restrictions that could be imposed by a tenant administrator.

For example, the exclusion of one or more particular users is fairly straightforward. In particular, a tenant administrator could exclude a user, including the service provider administrator, from being authorized. In the case of time based restrictions, the tenant administrator could restrict, or disable, authorization for users during blackout periods such as information technology (IT) upgrades, or events such as financial results creation. Time-based restrictions also provide a vehicle for ensuring that existing SAML tokens could be expired for such events. In the case of location based restrictions, a tenant administrator could restrict, or disable, authorization for users from specific geographic locations. As a final example, the elevation of a user role could be implemented temporarily to allow a user a higher authorized role. This restriction or constraint could be combined with time based restrictions. An example use case that would cover this would be elevation of a user while the tenant administrator is on vacation.

With the foregoing in view, and directing attention briefly to FIG. 7B, details are provided concerning an example tenant authorization profile 608. Similar to application authorization profiles 606, a tenant authorization profile 608 may include information concerning the information to which access can be granted, as well as information concerning roles. In the particular example of FIG. 4b, the name of the restricted data, that is, the limited data to which access can be granted, is identified, along with any version information that may pertain to that data. Correspondingly, one or more restricted data roles 617 may be identified as part of the tenant authorization profile 608. As well, one or more of the restricted data roles 617 may define a corresponding Application Role Opaque Object (AROO) 619, which may take the form of a privilege mask and/or other information specific to the data identified in the tenant authorization profile 608.

Figure 6A:
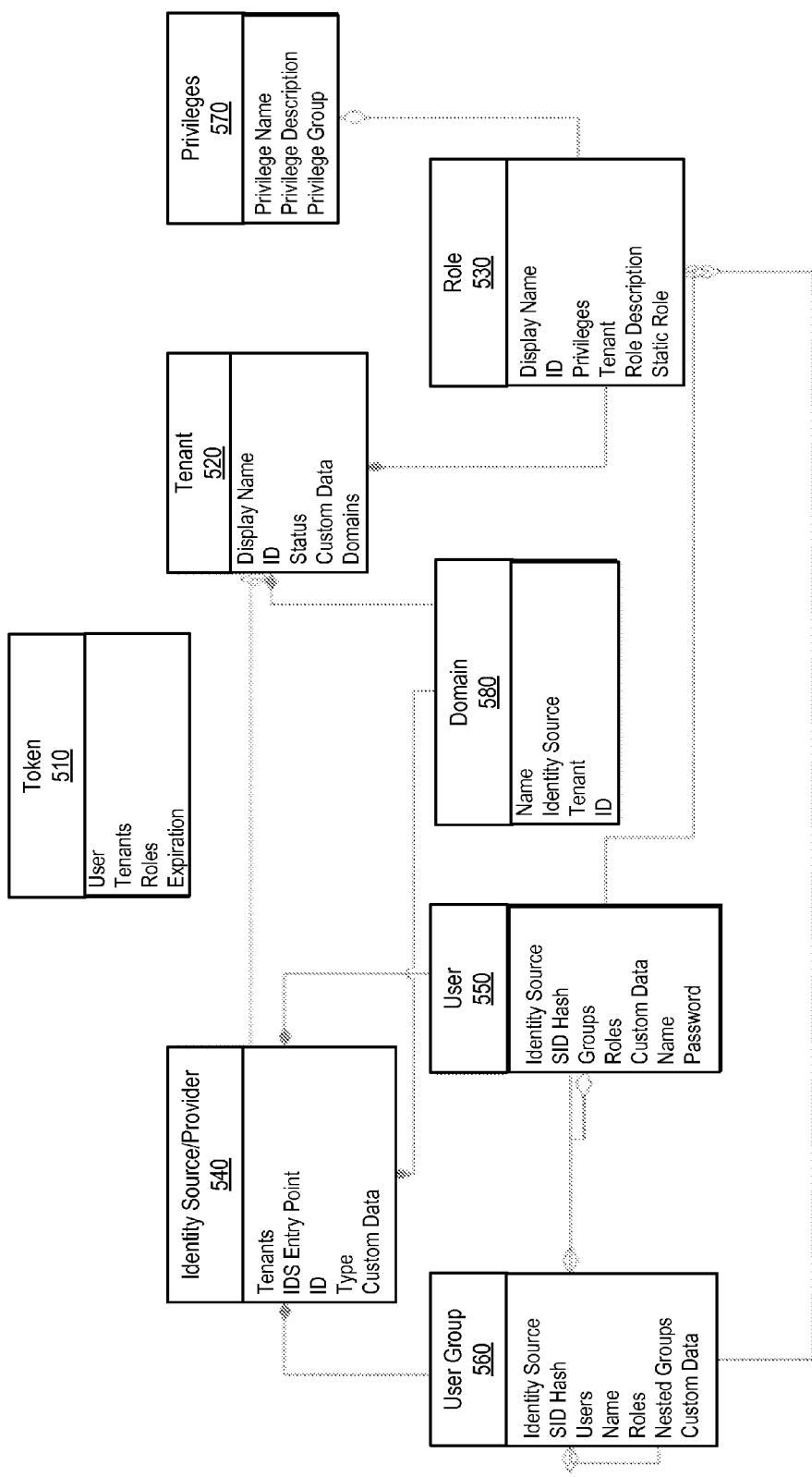
FIG. 6A is a block diagram illustrating an authentication/authorization store according to one embodiment of the invention.

FIG. 6A is a block diagram illustrating an authentication/authorization database according to one embodiment of the invention. FIG. 6A illustrates an example of AUTH server store 186 and includes various data objects (e.g., Tenant 520) defining the static access control settings. Similar formats of the settings may also be utilized in an AAP and TAP. In one embodiment, each data object includes, but is not limited to, one or more sets of elements (e.g., display name, SID hash, ID, tenant, etc.).

Referring to FIG. 6A, AUTH server store 186 includes, but is not limited to, one or more data objects or data structures, such as token object 510, tenant object 520, role object 530, identity source/provider object 540, user object 550, user group object 560, privileges object 570, and domain object 580. These objects represent an instance of one of the objects stored in the corresponding stores as shown in FIG. 4. For the purpose of illustration and simplicity, the reference numbers are maintained the same with respect to their corresponding stores. In this example as shown in FIG. 6A, for example, token object 510 and token store 510 are interchangeable terms. When an object is described, it is appreciated such an object is stored and accessed in its corresponding store identified by the same reference number. Each of these objects defines specific parameters for the specific object. One object may link with one or more other objects. Token 510 represents an AUTH token associated with a specific user, where token 510 may be a root parent object or a placeholder linking with other objects that define the attributes or parameters of the token. For example, tenant 520 includes information defining a particular tenant, which is defined by a specific tenant ID. Role 530 includes information defining a specific role. User 550 includes information defining a specific user. Domain 580 includes information defining a particular domain. User group 560 includes information defining a particular user group.

If a user represented by token object 510 is a member of multiple tenants, token object 510 will include one or more pointers linking with multiple tenant objects 520, each defining specifically one of the tenants of which the user is a member. For each of the tenants represented by the respective tenant object, the corresponding tenant object includes pointers linking with one or more role objects 530, where each of the role objects 530 defines a specific role within the tenant that the user has. In one embodiment, if a tenant is a child tenant of another tenant as a parent tenant, the child tenant object includes a parent tenant property storing a parent tenant ID identifying the parent tenant, i.e., the parent tenant object. Similarly, a parent tenant object may optionally include a child parent property storing a child tenant ID identifying a child tenant, e.g., a child tenant object. As a result, a tenant hierarchy tree is formed based on the relationships of tenants/tenant objects. Each of the role objects 530 includes pointers linking with one or more privilege objects 570, where each privilege object 570 defines a specific privilege. If the user is also a member of a particular user group (e.g., user group object 560), user object 550 defining the user will include a link referencing to a user group object that defines that particular user group. That is, when the AUTH server attempts to determine the user's tenants, roles, and privileges, etc., the AUTH server can obtain the user's token object 510 and "walk" through the objects in the chain or a tree hierarchy.

In one embodiment, AUTH server store 186 is configured to manage token 510 (also referred to as an AUTH token) for associating/mapping user 550 to role 530 at tenant 520. Further, users may be associated with additional and/or different roles within different tenants. For example, a user may be associated with an "Admin@TenantC/TenantHR" role with admin privileges within Tenant C/Tenant HR, while the user has no authorization (i.e., admin role and/or privileges) within Tenant C which is a parent-tenant of the Tenant C/HR tenant.

In one embodiment, token 510 allows a client (e.g., cloud storage server 160) to determine whether a user (or a user from a user group) is allowed to access one or more resources based on AUTH server store 186 associating/mapping the user to one or more roles within a tenant, and each role is further associated/mapped to one or more privileges. According to one embodiment, token 510 includes, but is not limited to, a user, a tenant, one or more roles, and an expiration. Token 510 is configured by AUTH server 180 in response to verifying/authenticating an access token that is validated (i.e., the access token is not expired and revoked).

In response to the validated access token, AUTH server 180 generates token 510 and transmits token 510 to the requesting user/component. Token 510 includes information identifying a set of one or more roles assigned to the requesting user. The set of one or more roles are generated based on a specific tenant that the requesting user specified in his/her access request (i.e., the tenant name specified at login). For example, if the requesting user is authenticated, AUTH server 180 transmits token 510 to the requesting user. After the successful authentication, token 510 includes the set of one or more roles assigned to the requesting user within that specified tenant, and further includes a set of one or more roles associated with one or more tenants (e.g., child-tenants) which are associated with that specified tenant according to a tenant tree hierarchy.

In one embodiment, tenant object 520 is a highest unit of abstraction for providing security and isolation in a multi-tenant environment. Tenant 520 provides an authorization scope of logical data isolation. For example, multi-tenant components (e.g., clients 101-102) may store their data in shared storage systems (e.g., cloud storage server 160), however each component must provide isolation for each resource associated with each tenant to avoid a first client accessing a resource from a second client.

In one embodiment, AUTH server store 186 provides the desired security and isolation by allowing each tenant (e.g., tenant 520) to configure their own: identity providers (e.g., identity source 540), users and user groups (e.g., user 550 and user group 560), and roles (e.g., role 530), which are associated with one or more privileges (e.g., privileges 570) and assigned to users to operate/perform within that particular tenant. Further, tenant 520 includes a parent-tenant element which allows a first tenant to create a new tenant, and if a second tenant is not specified as a parent-tenant of the new tenant, the first tenant is associated to the new tenant as the parent-tenant. Further, each resource request and operation (e.g., read/write) must be performed in a particular tenant.

According to one embodiment, privileges object 570 identifies a set of one or more privileges or permissions defining one or more operations which a user is authorized to perform in a multi-tenant environment. As used herein, an "operation" refers to an access privilege that includes a type of access (e.g., read/write) authorized for a resource. Each component in the multi-tenant environment is configured to implement/perform privileges associated with the user. For example, privileges 570 includes a "read email" privilege that provides a component managing access control to allow a user with the "read email" privilege to perform the "read email" operation. However, privileges 570 does not indicate a particular tenant in which, for example, the "read email" operation can be performed. Rather, a privilege object can be associated with a role object by specifying in a privilege property or attribute of the role object. A role object can then be associated with a tenant object by specifying a tenant property or attribute of the role object, etc., as shown in FIG. 6A.

In one embodiment, role object 530 includes, but is not limited to, one or more privileges associated with a particular tenant which can be assigned to user 550 and user group 560. For example, role object 530 may include one or more links linking with one or more of privilege object 570, each instance of privilege object 570 defining a different privilege. Each role (e.g., system admin, tenant admin, tenant operator, etc.) associates user 550 and/or user group 560 with a tenant and a set of one or more privileges which the user/user group can perform within the tenant. Similarly, user object 550 may include one or more references linking with one or more of user group object 560, each instance of user group object 560 defining a specific user group. Further, each of user object 550 and user group object 560 includes, but is not limited to, one or more roles that a user or a set of one or more users (i.e., a user group) is authorized to perform. In one embodiment, in order to provide security and isolation, the access control operations which may be performed by the requesting user depends on his/her role. For example, while a system admin may perform all operations, a tenant admin may only be authorized to perform a subset of the operations on a subset of the resources. A tenant user may be allowed to perform only a subset of the operations and/or subset of the resources that are available to the tenant admin. The operations which are available to the roles are defined, for example, through privileges 570 (also reference FIG. 7).

In one embodiment, identity source/provider object 540 defines, but is not limited to, an authentication provider such as a local user storage (i.e., internal user and user group account stores), LDAP (e.g., identity provider server 170), and/or Active Directory (AD). The authentication provider verifies/identifies a user based on a user ID, a password, a domain ID, and a tenant ID, or any other type of authentication protocol. Each identity source must be associated with one or more tenants which then allows principals of the identity source to request authentication/authorization within a particular tenant associated with that identity source. An identity source/provider may be shared by multiple users, multiple domains, and/or multiple tenants.

In one embodiment, one or more identity sources are configured to implement a tree structure that associates/maps a defined distinguished entry point with a specific host. For example, when identity source/provider object 540 is associated with a tenant (e.g., tenant object 520), identity source/provider object 540 is then assigned a "domain alias" (i.e., a domain ID). Note that in some embodiments, identity source/provider 540 may be named/identified differently in different tenants, however identity source/provider 540 may be associated with the same authentication provider.

According to one embodiment, domain object 580 defines, but is not limited to, an identity source (e.g., identity source/provider object 540), which is used to identify users within a particular tenant. Each tenant may have one or more domains (also referred to as domain names), and each domain is associated with a single identity source/provider. For example, if a user requests authentication at a particular tenant which is associated with multiple identity sources, domain 580 provides AUTH server store 186 with the specific authentication provider (e.g., LDAP, AD, etc.) associated with that particular tenant to allow AUTH server 180 to identify/verify the requesting user. It should be understood that FIG. 6A is an illustrated example of AUTH server store 186. That is, AUTH server store 186 may include additional and/or different data objects, which may be communicatively coupled in a different order.

These objects can be traversed at runtime to perform a variety of authentication and/or authorization. In one embodiment, in response to an authentication request of a user, authentication module 184 extracts a user ID, a password, a tenant ID of a tenant the user attempts to access, and a domain ID of a domain within the tenant. Note that a tenant may have different domains associated with the same or different identity sources or providers, which may be local or remote providers. Based on the tenant ID, authentication module 184 identifies and retrieves, for example, via a tenant manager, a tenant object corresponding to the tenant from a tenant store (e.g., tenant object 520). From the tenant object, authentication module 184 determines whether the tenant object contain a domain that matches the domain ID. If so, authentication module 184 identifies and retrieves, for example, via a domain manager, a domain object associated with the identified domain (e.g., domain object 580) from a domain store based on the domain ID. From the domain object, authentication module 184 identifies and retrieves, for example, via an identity manager, an identity source/provider object from an identity source store based on an identity source ID obtained from the domain object. The identity source/provider object includes a list of users that are identified by the corresponding identity provider. From the identity source object, authentication module 184 identifies and retrieves, for example, via a user manager, a user object (e.g., user object 550) based on the user ID obtained from the authentication request. Authentication module 184 then compares a first password obtained from the authentication request with a second password stored in the user object. If the first and second passwords are matched, the user is authenticated.

According to another embodiment, when a token such as token 510 is generated during an authorization process in response to an authorization request, authorization module 182 obtains a user object, i.e., user object 550, corresponding to the user of the authorization request based on the user ID, tenant ID, and/or domain ID extracted from the authorization request. From user object, authorization module 182 identifies a list of roles associated with or assigned to the user. If a user is also a member of a user group, the user object further includes a user group ID identifying a user group, which may be represented by a user group object (e.g., user group object 560). A user group may be associated with a set of roles as well. As a member of the user group, a user inherits the roles of the corresponding user group. A user group object includes a list of one or more roles represented by a list of one or more role objects (e.g., role object 530). For each of the roles, which may be identified via a user object and/or user group object(s) associated with the user being authorized, a role object such as role object 530 is identified and obtained. From each role object, a corresponding tenant is identified, which may be represented by a tenant object (e.g., tenant object 520). From the role objects associated with the user, for example, from a tenant property of each role object, a list of tenants associated with the user may also be identified. In addition, a list of privileges of the role is also identified from the role object, where each privilege is represented by a privilege object such as privilege object 570. Thus, by traversing tenant object 520, domain object 580, identity source/provider object 540, user object 550, user group object 560, role objects 530, and privilege objects 570, authorization module 182 is able to identify a list of roles, privileges of each role, and tenants of the roles associated with the user. The information representing the tenants and roles are then compiled into token 510, optionally encrypted by one or more encryption keys.

Figure 6B:
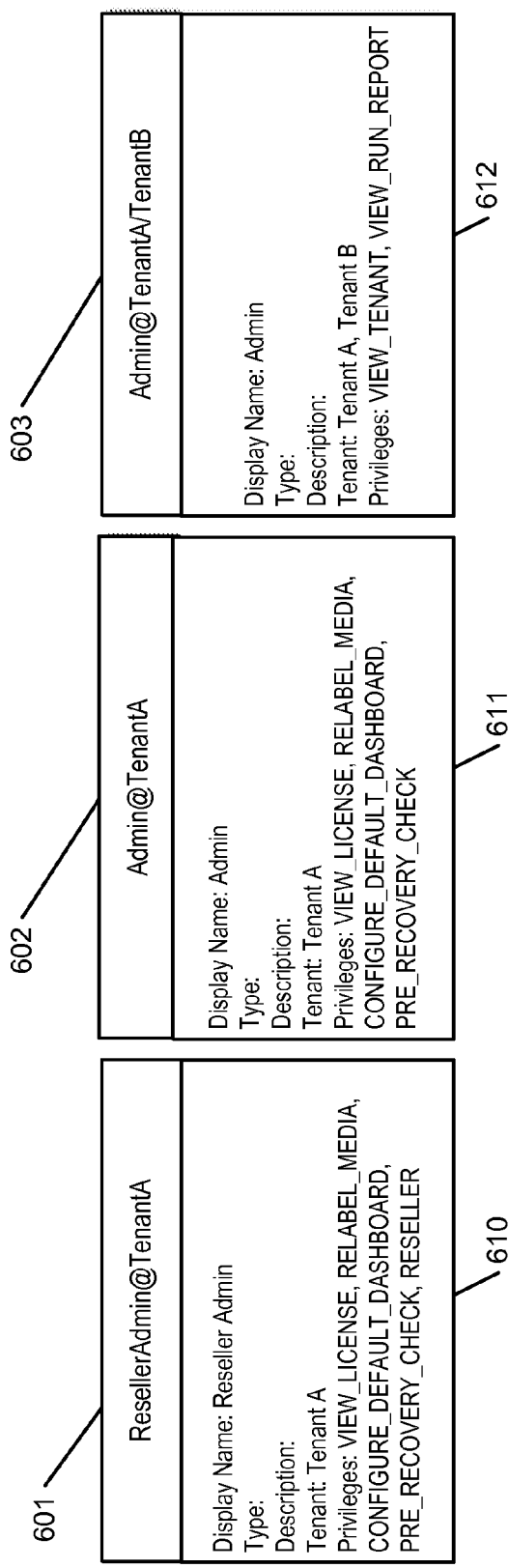
FIG. 6B is a block diagram illustrating an example of roles according to one embodiment of the invention.

FIG. 6B is a block diagram illustrating an example of roles/tenants according to one embodiment of the invention. For example, the illustrated roles may be configured by AUTH server 180 and associated with one or more users in a multi-tenant environment. Referring now to FIG. 6B, the illustrated example includes three different roles: "ResellerAdmin@TenantA" role 601, "Admin@TenantA" role 602, and "Admin@TenantA/Tenant B" role 603. Continuing on with the above example, each illustrated role may be used by cloud storage server 160 to allow a client to determine whether a user is allowed to access a resource from a particular tenant.

In one embodiment, each role includes a set of one or more parameters (e.g., blocks 610-612). The set of one or more parameters includes, but is not limited to, a display name, a type, a description, one or more tenants (i.e., a tenant and one or more child-tenants associated with the tenant), and one or more privileges. Roles 601-603 may be generated/associated with one or more AUTH tokens (not shown) which are used by tenants/components to authorize and manage users access control in a multi-tenant environment. For example, if a first user is associated with "Admin@TenantA" role 602, the first user is allowed to perform all the privileges in blocks 611-612 at "Tenant A" and "Tenant B" tenants (i.e., "Tenant B" is a child-tenant of "Tenant A"), while the first user is denied the privilege of {"privilege":"Reseller"} in block 610 at "Tenant A" tenant.

FIG. 8 is a flow diagram illustrating a process of authentication and authorization according to one embodiment of the invention. Process 800 may be performed by processing logic that may include software, hardware, or a combination thereof. For example, process 800 may be performed by authentication module 184 and/or authorization module 182. Referring to FIG. 8, at block 801, in response to a request for authorization of a user received from a client application, processing logic determines a tenant associated with the user. In response to the request, at block 802, processing logic determines one or more user roles of the user within the tenant. At block 803, for each of the user roles, processing logic determines one or more user access privileges associated with the tenant. These user roles and user access privileges are determined based on the static access control settings as shown in FIGS. 6A-6B. At block 804, processing logic accesses an AAP associated with the client application to determine whether any of the user roles defined in the static access control settings matches any of the application roles defined in the AAP. At block 805, for any of the user roles that matches an application role, the corresponding user access privileges may be modified in view of the application access privileges of the matching application role. Processing logic may also modify other determined static access control settings based on other access control information stored in the AAP. At block 806, an access token is generated having the static access control information, as well as the modified access control information, stored therein. The access token is then transmitted to the client application.

In this situation, an access token is also referred to as an authorization token. For the purpose of illustration, an access token is referred to a token after a user has been authenticated, for example, based on username and password. An access token is typically utilized to indicate that a particular user has been authenticated. It does not include user roles and/or tenant information. An authorization token would store authorization information of a user including the user roles, privileges, and tenant information of the user. An access token is generated after a user has been authenticated. An authorization token is generated after the user has been authorized. In some situations, there are at least two transactions: 1) authentication and 2) authorization. For example, referring to FIG. 2, the token returned via transaction 235 is an access token, while the token returned via transaction 240 is an authorization token. In other situations, a single request may cause both authentication and authorization to be performed, and in such a situation, an authorization token is generated in response to the single request.

Figure 9:
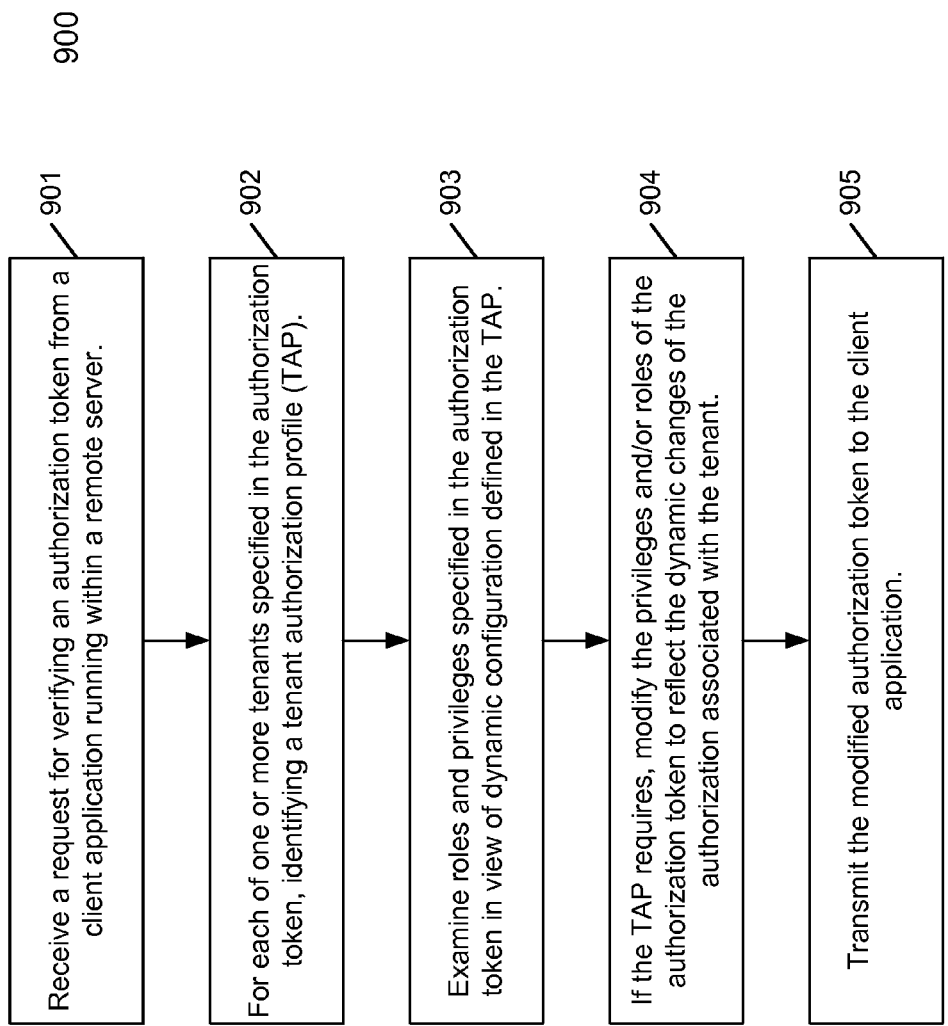
FIG. 9 is a flow diagram illustrating a process of authentication and authorization according to another embodiment of the invention.

FIG. 9 is a flow diagram illustrating a process of authentication and authorization according to one embodiment of the invention. Process 900 may be performed by processing logic that may include software, hardware, or a combination thereof. For example, process 900 may be performed by authentication module 184 and/or authorization module 182. Referring to FIG. 9, at block 901, processing logic receives a request for verifying an authorization token from a client application running within a remote server. For each of the tenants specified in the authorization token, processing logic identifies a TAP associated with the tenant. At block 903, processing logic examines the user roles and user privileges specified in the authorization token in view of the tenant roles and tenant privileges defined in the TAP, as well as other information stated in the TAP. If the TAP indicates, at block 904, processing logic modifies some static access control settings in the authorization token based on the dynamic tenant access control information (e.g., tenant roles, tenant privileges). At block 905, the authorization token with modified access control information is transmitted back to the client application.

Figure 10:
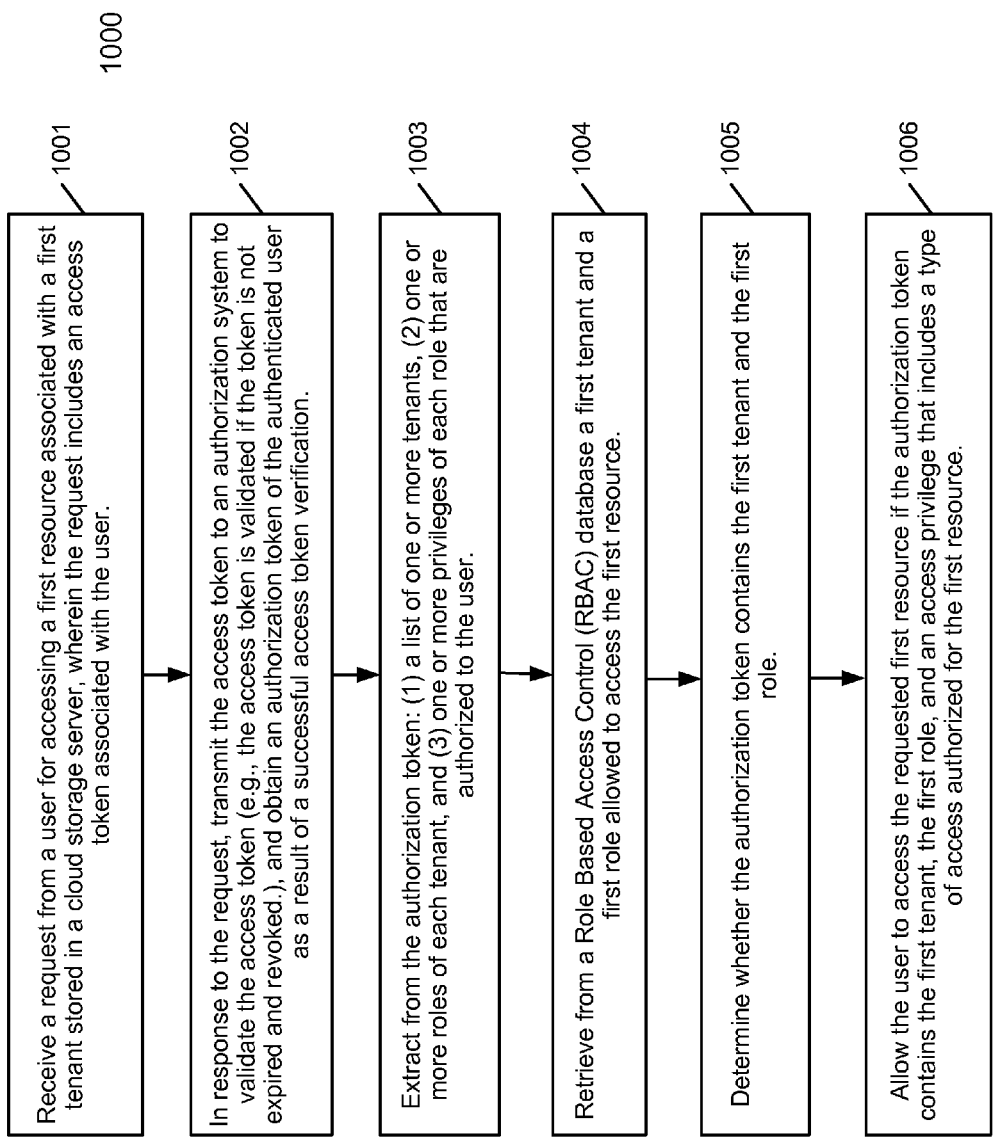
FIG. 10 is a flow diagram illustrating a process of authentication and authorization according to another embodiment of the invention.

FIG. 10 is a flow diagram illustrating a method for determining whether a role request from a user in a multi-tenant environment should be allowed or denied according to one embodiment. For example, method 1000 can be performed by cloud storage server 160. Method 1000 can be implemented in software, firmware, hardware, or any combination thereof. Referring now to FIG. 10, at block 1001, a cloud storage server receives a request from a user for accessing a first resource associated with a first tenant stored in a cloud storage server, wherein the request includes an access token associated with the user. At block 1002, in response to the request, a cloud storage server transmits the access token to an authorization system to validate the access token. For example, cloud storage server 160 transmits the access token to AUTH server 180 to validate the access token by determining whether the access token is expired and/or revoked (i.e., a valid access token is not expired and revoked). As a result of a successful access token verification, cloud storage server 160 obtains an AUTH token of the authenticated user. At block 1003, a cloud storage server extracts from the AUTH token: (1) a list of one or more tenants, (2) one or more roles of each tenant, and (3) one or more privileges of each role that are authorized to the user. At block 1004, a cloud storage server retrieves from a RBAC database a first tenant and a first role allowed to access the first resource. For example, cloud storage server 160 (e.g., a client) retrieves from its corresponding ACE/ACL a first tenant and a first role that are required to access the first resource. At block 1005, a cloud storage server determines whether the AUTH token contains the first tenant and the first role. For example, a component of cloud storage server 160 performs RBAC to determine if there is a match between an ACE of the first resource and the AUTH token associated with the user. At block 1006, a cloud storage server allows the user to access the requested first resource if the AUTH token contains the first tenant, the first role, and an access privilege that includes a type of access authorized for the first resource.

Figure 11:
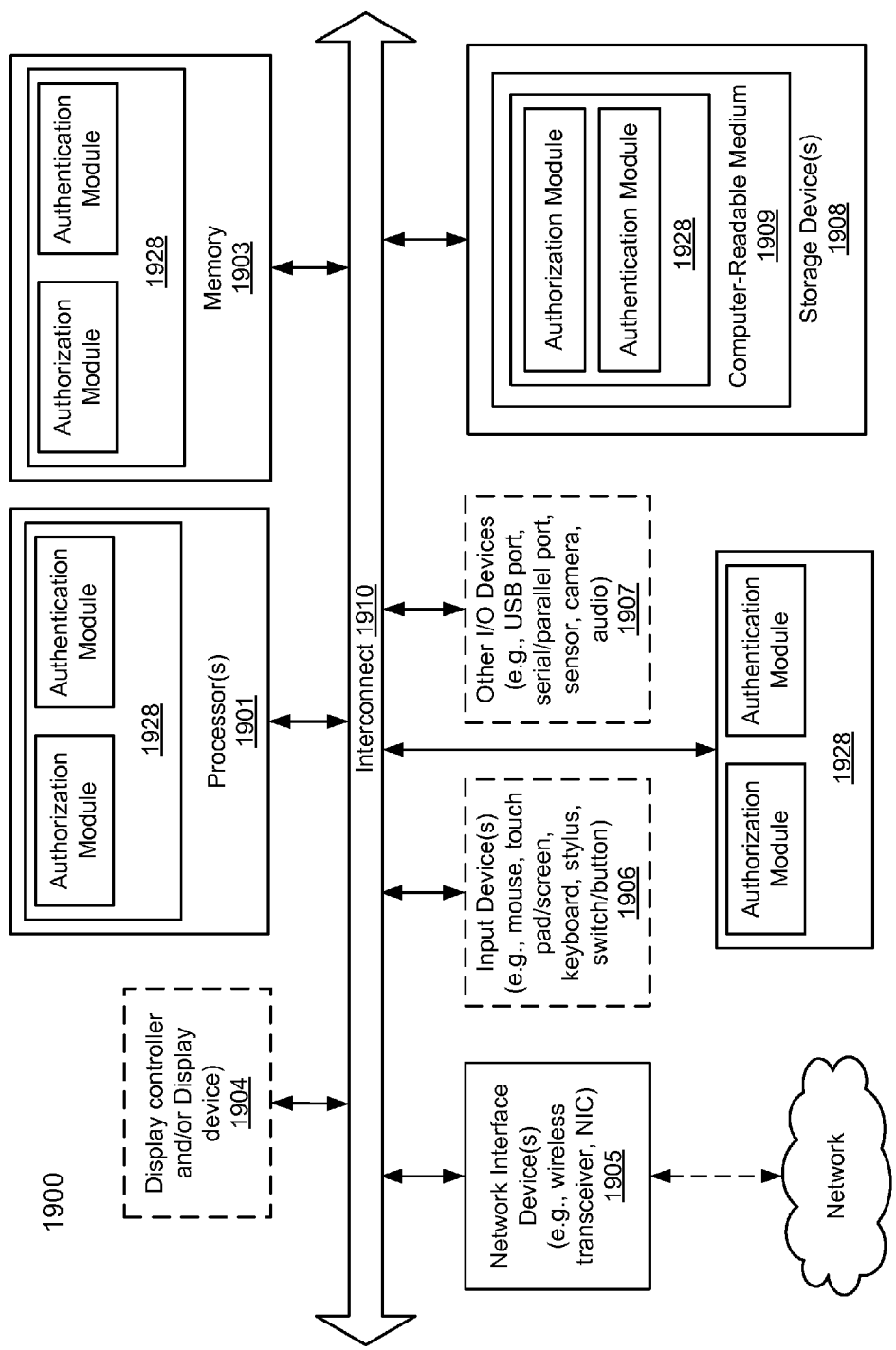
FIG. 11 is a block diagram illustrating a data processing system according to one embodiment.

FIG. 11 is a block diagram illustrating an example of a data processing system which may be used with one embodiment of the invention. For example, system 1900 may represents any of data processing systems described above performing any of the processes or methods described above. System 1900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1900 is intended to show a high level view of many components of the computer system. However, it is to be understood that additional components may be present in certain implementations and furthermore, different arrangement of the components shown may occur in other implementations. System 1900 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1900 includes processor 1901, memory 1903, and devices 1905-1908 via a bus or an interconnect 1910. Processor 1901 may represent a single processor or multiple processors with a single processor core or multiple processor cores included therein. Processor 1901 may represent one or more general-purpose processors such as a microprocessor, a central processing unit (CPU), or the like. More particularly, processor 1901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1901, which may be a low power multi-core processor socket such as an ultra-low voltage processor, may act as a main processing unit and central hub for communication with the various components of the system. Such processor can be implemented as a system on chip (SoC). Processor 1901 is configured to execute instructions for performing the operations and steps discussed herein. System 1900 may further include a graphics interface that communicates with optional graphics subsystem 1904, which may include a display controller, a graphics processor, and/or a display device.

Processor 1901 may communicate with memory 1903, which in one embodiment can be implemented via multiple memory devices to provide for a given amount of system memory. Memory 1903 may include one or more volatile storage (or memory) devices such as random access memory (RAM), dynamic RAM (DRAM), synchronous DRAM (SDRAM), static RAM (SRAM), or other types of storage devices. Memory 1903 may store information including sequences of instructions that are executed by processor 1901, or any other device. For example, executable code and/or data of a variety of operating systems, device drivers, firmware (e.g., input output basic system or BIOS), and/or applications can be loaded in memory 1903 and executed by processor 1901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1900 may further include IO devices such as devices 1905-1908, including network interface device(s) 1905, optional input device(s) 1906, and other optional IO device(s) 1907. Network interface device 1905 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1906 may include a mouse, a touch pad, a touch sensitive screen (which may be integrated with display device 1904), a pointer device such as a stylus, and/or a keyboard (e.g., physical keyboard or a virtual keyboard displayed as part of a touch sensitive screen). For example, input device 1906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1907 may include an audio device. An audio device may include a speaker and/or a microphone to facilitate voice-enabled functions, such as voice recognition, voice replication, digital recording, and/or telephony functions. Other IO devices 1907 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1907 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1910 via a sensor hub (not shown), while other devices such as a keyboard or thermal sensor may be controlled by an embedded controller (not shown), dependent upon the specific configuration or design of system 1900.

To provide for persistent storage of information such as data, resources, applications, one or more operating systems and so forth, a mass storage (not shown) may also couple to processor 1901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1901, e.g., via a serial peripheral interface (SPI). This flash device may provide for non-volatile storage of system software, including a basic input/output software (BIOS) as well as other firmware of the system.

Storage device 1908 may include computer-accessible storage medium 1909 (also known as a machine-readable storage medium or a computer-readable medium) on which is stored one or more sets of instructions or software (e.g., authorization/authentication module, module, unit, and/or logic 1928) embodying any one or more of the methodologies or functions described herein. Authentication and authorization module/unit/logic 1928 may also reside, completely or at least partially, within memory 1903 and/or within processor 1901 during execution thereof by data processing system 1900, memory 1903 and processor 1901 also constituting machine-accessible storage media. Authentication and authorization module/unit/logic 1928 may further be transmitted or received over a network via network interface device 1905.

Computer-readable storage medium 1909 may also be used to store the some software functionalities described above persistently. While computer-readable storage medium 1909 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Authentication and authorization module/unit/logic 1928, components and other features described herein can be implemented as discrete hardware components or integrated in the functionality of hardware components such as ASICS, FPGAs, DSPs or similar devices. In addition, authentication and authorization module/unit/logic 1928 can be implemented as firmware or functional circuitry within hardware devices. Further, authentication and authorization module/unit/logic 1928 can be implemented in any combination hardware devices and software components.

Note that while system 1900 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for authenticating and authorizing users in a multi-tenant environment, the method comprising:
   in response to a request received from a client application running within a client device to authorize a user for accessing a resource associated with a tenant,
       determining one or more user roles of the user within the tenant, and
       for each of the user roles, determining one or more user privileges the user is entitled within a capacity of the user role based on static access control settings associated with the user;
   accessing a tenant authorization profile associated with the tenant to determine one or more tenant roles and one or more tenant privileges for each tenant role, wherein the tenant roles and tenant privileges are dynamically configured and stored as part of dynamic access control settings in the tenant authorization profile;
   for each of the user roles that matches at least one of the tenant roles, modifying at least one user privilege based on corresponding tenant privileges of the matched tenant role;
   generating a token based on the user roles and the user privileges, including the modified user privileges; and
   transmitting the token to the client device to allow the client application to determine whether the user is allowed to access the resource of the tenant based on the token;
   wherein modifying at least one user privilege based on corresponding tenant privileges of the matched tenant role comprises:
       determining a first time associated with the request;
       determining a time period specified in the tenant authorization profile;
       determining whether the first time is within the time period specified in the tenant authorization profile; and
       removing or disabling user privileges of the tenant from the token, in response to determining that the first time is within the time period.

2. The method of claim 1, wherein the user roles and user privileges are configured and stored as part of the static access control settings stored in a persistent storage device by a first administrator of a service provider that provides storage resources to a plurality of tenants, and wherein the tenant roles and tenant privileges are dynamically configured and stored via a configuration interface by a second administrator associated with the tenant.

3. The method of claim 2, wherein the user privileges are modified and incorporated into the token based on the tenant privileges, without modifying the user privileges as part of the static access control settings stored in the persistent storage device.

4. The method of claim 2, wherein when a user role of the static access control settings matches a tenant role of the tenant authorization profile, tenant privileges of the matched tenant role of the tenant authorization profile override user privileges of the matched user role in the token.

5. The method of claim 1, wherein modifying at least one user privilege based on corresponding tenant privileges of the matched tenant role comprises:
  obtaining a first user ID from the request, the first user ID uniquely identifying the user;
  obtaining a list of user IDs from the tenant authorization profile, the list of user IDs representing a list of users to be excluded;
  determining whether the first user ID is included in the list of user IDs from the tenant authorization profile; and
  removing or disabling user privileges of the tenant from the token, in response to determining that the first user ID is included in the list of user IDs.

6. The method of claim 1, wherein modifying at least one user privilege based on corresponding tenant privileges of the matched tenant role comprises:
  determining a first geographic location of the user;
  determining a list of geographic locations from the tenant authorization profile;
  determining whether the first geographic location is the list of geographic locations specified in the tenant authorization profile; and
  removing or disabling user privileges of the tenant from the token, in response to determining that the first geographic location is the list of geographic locations.

7. The method of claim 1, further comprising:
  accessing an application authorization profile associated with the client application to determine one or more application roles and one or more application privileges for each application role; and
  for each of the user roles that matches at least one of the application roles, modifying at least one user privilege based on corresponding application privileges of the matched application role.

8. The method of claim 7, wherein when a user role of the static access control settings matches an application role of the application authorization profile, application privileges of the matched application role of the application authorization profile override user privileges of the matched user role in the token.

9. A non-transitory machine-readable medium having instructions stored therein, which when executed by a processor, cause the processor to perform operations for authenticating and authorizing users in a multi-tenant environment, the operations comprising:
  in response to a request received from a client application running within a client device to authorize a user for accessing a resource associated with a tenant,
    determining one or more user roles of the user within the tenant, and
    for each of the user roles, determining one or more user privileges the user is entitled within a capacity of the user role based on static access control settings associated with the user;
  accessing a tenant authorization profile associated with the tenant to determine one or more tenant roles and one or more tenant privileges for each tenant role, wherein the tenant roles and tenant privileges are dynamically configured and stored as part of dynamic access control settings in the tenant authorization profile;
  for each of the user roles that matches at least one of the tenant roles, modifying at least one user privilege based on corresponding tenant privileges of the matched tenant role;
  generating a token based on the user roles and the user privileges, including the modified user privileges; and
  transmitting the token to the client device to allow the client application to determine whether the user is allowed to access the resource of the tenant based on the token;
  wherein modifying at least one user privilege based on corresponding tenant privileges of the matched tenant role comprises:
    determining a first time associated with the request;
    determining a time period specified in the tenant authorization profile;
    determining whether the first time is within the time period specified in the tenant authorization profile; and
    removing or disabling user privileges of the tenant from the token, in response to determining that the first time is within the time period.

10. The non-transitory machine-readable medium of claim 9, wherein the user roles and user privileges are configured and stored as part of the static access control settings stored in a persistent storage device by a first administrator of a service provider that provides storage resources to a plurality of tenants, and wherein the tenant roles and tenant privileges are dynamically configured and stored via a configuration interface by a second administrator associated with the tenant.

11. The non-transitory machine-readable medium of claim 10, wherein the user privileges are modified and incorporated into the token based on the tenant privileges, without modifying the user privileges as part of the static access control settings stored in the persistent storage device.

12. The non-transitory machine-readable medium of claim 10, wherein when a user role of the static access control settings matches a tenant role of the tenant authorization profile, tenant privileges of the matched tenant role of the tenant authorization profile override user privileges of the matched user role in the token.

13. The non-transitory machine-readable medium of claim 9, wherein modifying at least one user privilege based on corresponding tenant privileges of the matched tenant role comprises:
  obtaining a first user ID from the request, the first user ID uniquely identifying the user;
  obtaining a list of user IDs from the tenant authorization profile, the list of user IDs representing a list of users to be excluded;
  determining whether the first user ID is included in the list of user IDs from the tenant authorization profile; and
  removing or disabling user privileges of the tenant from the token, in response to determining that the first user ID is included in the list of user IDs.

14. The non-transitory machine-readable medium of claim 9, wherein modifying at least one user privilege based on corresponding tenant privileges of the matched tenant role comprises:
- determining a first geographic location of the user;
- determining a list of geographic locations from the tenant authorization profile;
- determining whether the first geographic location is the list of geographic locations specified in the tenant authorization profile; and
- removing or disabling user privileges of the tenant from the token, in response to determining that the first geographic location is the list of geographic locations.

15. A system, comprising:
- a processor; and
- a memory coupled to the processor for storing instructions, which when executed from the memory, cause the processor to perform operations, the operations including:
  - in response to a request received from a client application running within a client device to authorize a user for accessing a resource associated with a tenant,
    - determining one or more user roles of the user within the tenant, and
    - for each of the user roles, determining one or more user privileges the user is entitled within a capacity of the user role based on static access control settings associated with the user,
  - accessing a tenant authorization profile associated with the tenant to determine one or more tenant roles and one or more tenant privileges for each tenant role, wherein the tenant roles and tenant privileges are dynamically configured and stored as part of dynamic access control settings in the tenant authorization profile,
  - for each of the user roles that matches at least one of the tenant roles, modifying at least one user privilege based on corresponding tenant privileges of the matched tenant role,
  - generating a token based on the user roles and the user privileges, including the modified user privileges, and
  - transmitting the token to the client device to allow the client application to determine whether the user is allowed to access the resource of the tenant based on the token;
  - wherein modifying at least one user privilege based on corresponding tenant privileges of the matched tenant role comprises:
    - determining a first time associated with the request;
    - determining a time period specified in the tenant authorization profile;
    - determining whether the first time is within the time period specified in the tenant authorization profile; and
    - removing or disabling user privileges of the tenant from the token, in response to determining that the first time is within the time period.

16. The system of claim 15, wherein the user roles and user privileges are configured and stored as part of the static access control settings stored in a persistent storage device by a first administrator of a service provider that provides storage resources to a plurality of tenants, and wherein the tenant roles and tenant privileges are dynamically configured and stored via a configuration interface by a second administrator associated with the tenant.

17. The system of claim 16, wherein the user privileges are modified and incorporated into the token based on the tenant privileges, without modifying the user privileges as part of the static access control settings stored in the persistent storage device.

18. The system of claim 16, wherein when a user role of the static access control settings matches a tenant role of the tenant authorization profile, tenant privileges of the matched tenant role of the tenant authorization profile override user privileges of the matched user role in the token.

19. The system of claim 15, wherein modifying at least one user privilege based on corresponding tenant privileges of the matched tenant role comprises:
- obtaining a first user ID from the request, the first user ID uniquely identifying the user;
- obtaining a list of user IDs from the tenant authorization profile, the list of user IDs representing a list of users to be excluded;
- determining whether the first user ID is included in the list of user IDs from the tenant authorization profile; and
- removing or disabling user privileges of the tenant from the token, in response to determining that the first user ID is included in the list of user IDs.

20. The system of claim 15, wherein modifying at least one user privilege based on corresponding tenant privileges of the matched tenant role comprises:
- determining a first geographic location of the user;
- determining a list of geographic locations from the tenant authorization profile;
- determining whether the first geographic location is the list of geographic locations specified in the tenant authorization profile; and
- removing or disabling user privileges of the tenant from the token, in response to determining that the first geographic location is the list of geographic locations.

* * * * *